(12) United States Patent
Reddy et al.

(10) Patent No.: US 8,811,393 B2
(45) Date of Patent: Aug. 19, 2014

(54) IP ADDRESS VERSION INTERWORKING IN COMMUNICATION NETWORKS

(75) Inventors: Naveen Reddy, Andhra Pradesh (IN); Kaitki Agarwal, Westford, MA (US)

(73) Assignee: Cisco Technology, Inc., San Jose, CA (US)

( * ) Notice: Subject to any disclaimer, the term of this patent is extended or adjusted under 35 U.S.C. 154(b) by 182 days.

(21) Appl. No.: 12/897,422

(22) Filed: Oct. 4, 2010

(65) Prior Publication Data

US 2012/0082158 A1    Apr. 5, 2012

(51) Int. Cl.
*H04J 3/16* (2006.01)
*H04L 29/06* (2006.01)

(52) U.S. Cl.
CPC .... *H04L 29/06068* (2013.01); *H04L 29/06142* (2013.01)
USPC ............................. 370/389; 370/392; 370/466

(58) Field of Classification Search
CPC .................... H04L 29/06142; H04L 29/06068
USPC ......... 370/259, 328, 331, 338, 352, 389, 466, 370/467
See application file for complete search history.

(56) References Cited

U.S. PATENT DOCUMENTS

| | | |
|---|---|---|
| 6,963,569 B1 | 11/2005 | Briddell et al. |
| 7,065,093 B1 | 6/2006 | Kumar et al. |
| 7,082,121 B1 | 7/2006 | Stammers et al. |
| 7,130,625 B2 | 10/2006 | Akgun et al. |
| 7,283,533 B1 | 10/2007 | Kumar et al. |
| 7,477,638 B1 | 1/2009 | Kumar et al. |
| 7,502,615 B2 | 3/2009 | Wilhoite et al. |
| 7,529,233 B2 | 5/2009 | Kumarasamy et al. |
| 7,593,398 B2 | 9/2009 | Booth, III et al. |

(Continued)

FOREIGN PATENT DOCUMENTS

| | | |
|---|---|---|
| EP | 1 435 748 B1 | 3/2006 |
| JP | 2003070043 A | 3/2003 |

(Continued)

OTHER PUBLICATIONS

3GPP TR 25.820 v8.0.0 (Mar. 2008), 3rd Generation Partnership Project; Technical Specification Group Radio Access Networks; 3G Home NobeBStudy Item Technical Report (Release 8); http://www.3gpp.org, 2008. 37 pages.

(Continued)

*Primary Examiner* — Brian O'Connor
(74) *Attorney, Agent, or Firm* — Wilmer Cutler Pickering Hale and Dorr LLP

(57) ABSTRACT

Systems and methods are provided for supporting IPv4-IPv6 interworking of SIP messages in wireless networks and IMS networks. The interworking can be provided to smooth migration to an all-IPv6 IMS network by allowing the use and support of existing legacy IPv4 infrastructure. This functionality may be provided by a call session control function (CSCF) interposed between a user equipment (UE) and an IMS core network with interworking functionality or an interworking module. This device serves as a back-to-back user agent (B2BUA), allocates IP addresses from a pool, performs next-hop route protocol discovery, and maintains and stores information within the gateway as well as interworking and rewriting IP addresses within network messages, while proxying and maintaining sessions between the UE and the IMS core network. This allows for faster call setup, reduced capex/opex, improved debuggability, increased capacity and subscriber density by call processing distribution, and better user experience.

20 Claims, 19 Drawing Sheets

(56) References Cited

U.S. PATENT DOCUMENTS

| | | | |
|---|---|---|---|
| 7,596,102 B2* | 9/2009 | Forbes et al. | 370/260 |
| 7,660,584 B2 | 2/2010 | Maxwell et al. | |
| 7,668,159 B2* | 2/2010 | Buckley et al. | 370/354 |
| 7,792,143 B1 | 9/2010 | Jones et al. | |
| 7,808,961 B2* | 10/2010 | Ishii et al. | 370/338 |
| 7,830,911 B2* | 11/2010 | Jimmei | 370/466 |
| 7,907,618 B2* | 3/2011 | Chen | 370/395.5 |
| 7,936,761 B2* | 5/2011 | Takeda | 370/395.21 |
| 7,995,559 B2 | 8/2011 | Bao et al. | |
| 8,064,909 B2 | 11/2011 | Spinelli et al. | |
| 8,160,578 B2* | 4/2012 | Lindgren | 455/432.2 |
| 8,165,573 B2* | 4/2012 | Buckley et al. | 455/417 |
| 8,175,236 B2* | 5/2012 | Pandey et al. | 379/114.2 |
| 2003/0050076 A1 | 3/2003 | Watanabe | |
| 2004/0008645 A1 | 1/2004 | Janevski et al. | |
| 2004/0090937 A1 | 5/2004 | Chaskar et al. | |
| 2004/0137918 A1 | 7/2004 | Varonen et al. | |
| 2004/0218564 A1 | 11/2004 | Henrikson | |
| 2005/0053034 A1 | 3/2005 | Chiueh | |
| 2005/0117546 A1 | 6/2005 | Lioy et al. | |
| 2005/0124341 A1 | 6/2005 | Myllymaki et al. | |
| 2005/0190757 A1 | 9/2005 | Sajassi | |
| 2006/0018328 A1 | 1/2006 | Mody et al. | |
| 2006/0114855 A1 | 6/2006 | Zheng | |
| 2006/0126564 A1 | 6/2006 | Ramanna et al. | |
| 2006/0245395 A1 | 11/2006 | Jain et al. | |
| 2006/0264213 A1 | 11/2006 | Thompson | |
| 2006/0285519 A1 | 12/2006 | Narayanan et al. | |
| 2006/0291412 A1 | 12/2006 | Naqvi et al. | |
| 2006/0291489 A1 | 12/2006 | Naqvi et al. | |
| 2007/0097983 A1 | 5/2007 | Nylander et al. | |
| 2007/0105568 A1 | 5/2007 | Nylander et al. | |
| 2007/0140220 A1 | 6/2007 | Doradla et al. | |
| 2007/0174443 A1* | 7/2007 | Shaheen et al. | 709/223 |
| 2007/0189255 A1 | 8/2007 | Navali et al. | |
| 2007/0195805 A1* | 8/2007 | Lindgren | 370/401 |
| 2007/0201367 A1 | 8/2007 | Chen et al. | |
| 2007/0201480 A1 | 8/2007 | Bao et al. | |
| 2007/0211726 A1 | 9/2007 | Kuang et al. | |
| 2007/0243872 A1 | 10/2007 | Gallagher et al. | |
| 2007/0253371 A1 | 11/2007 | Harper et al. | |
| 2007/0254661 A1 | 11/2007 | Chowdhury et al. | |
| 2007/0254673 A1 | 11/2007 | Stenberg et al. | |
| 2008/0043721 A1 | 2/2008 | Kumarasamy et al. | |
| 2008/0062964 A1 | 3/2008 | Kumarasamy et al. | |
| 2008/0082681 A1 | 4/2008 | Leseberg et al. | |
| 2008/0112397 A1 | 5/2008 | Kumarasamy et al. | |
| 2008/0176582 A1 | 7/2008 | Ghai et al. | |
| 2008/0205342 A1 | 8/2008 | Radhakrishnan et al. | |
| 2008/0216167 A1* | 9/2008 | Imai et al. | 726/12 |
| 2008/0233947 A1 | 9/2008 | Herrero-Veron | |
| 2008/0254768 A1 | 10/2008 | Faccin | |
| 2008/0285466 A1 | 11/2008 | Salam et al. | |
| 2009/0061821 A1 | 3/2009 | Chen et al. | |
| 2009/0061873 A1 | 3/2009 | Bao et al. | |
| 2009/0067417 A1 | 3/2009 | Kalavade et al. | |
| 2009/0073936 A1 | 3/2009 | Jentz et al. | |
| 2009/0080382 A1 | 3/2009 | Chen et al. | |
| 2009/0086742 A1 | 4/2009 | Ghai et al. | |
| 2009/0089447 A1 | 4/2009 | Balachandran et al. | |
| 2009/0098872 A1 | 4/2009 | Deshpande et al. | |
| 2009/0110171 A1 | 4/2009 | Kannan et al. | |
| 2009/0129372 A1* | 5/2009 | Pandey et al. | 370/352 |
| 2009/0298458 A1* | 12/2009 | Bakker et al. | 455/404.1 |
| 2009/0305684 A1 | 12/2009 | Jones et al. | |
| 2010/0008291 A1 | 1/2010 | LeBlanc et al. | |
| 2010/0091653 A1 | 4/2010 | Koodli et al. | |
| 2010/0195640 A1 | 8/2010 | Park et al. | |
| 2010/0260141 A1 | 10/2010 | Chowdhury et al. | |
| 2010/0285797 A1 | 11/2010 | Ghai et al. | |
| 2011/0051683 A1 | 3/2011 | Ramankutty et al. | |
| 2011/0141947 A1* | 6/2011 | Li et al. | 370/259 |

FOREIGN PATENT DOCUMENTS

| | | |
|---|---|---|
| JP | 2004515986 A | 5/2004 |
| JP | 2005229583 A | 8/2005 |
| JP | 2006042001 A | 2/2006 |
| JP | 2006092242 A | 4/2006 |
| WO | WO-2004004378 A1 | 1/2004 |
| WO | WO-2005051026 A1 | 6/2005 |
| WO | WO-2006052487 A2 | 5/2006 |

OTHER PUBLICATIONS

3GPP TR 29.814 v7.1.0 (Jun. 2007), 3rd Generation Partnership Project; Technical Specification Group Core Networks and Terminals Feasibility Study on Bandwidth Savings at Nb Interface with IP transport (Release 7), Global System for MobileCommunications, http://www.3gpp.org, 2007. 19 pages.

3GPP TS 22.011 v8.4.0 (Jun. 2008), 3rd Generation Partnership Project; Technical Specification Group Services and System Aspects; Service accessibility (Release 8), Global System for Mobile Communications, http://www/3gpp.org, 2008. 25 pages.

3GPP TS 22.220 v0.3.0 (Jul. 2008), 3rd Generation Partnership Project; Technical Specification Group Services and System Aspects; Service requirements for Home NodeBs and Home eNodeBs; (Release 9), http://www.3gpp.org, 2008. 13 pages.

3GPP TS 23.041 v7.0.0 (Mar. 2006), 3rd Generation Partnership Project; Technical Specification Group Terminals; Technical realization of Cell Broadcast Service (CBS) (Release 7), Global System for Mobile Communications, http://www.3gpp.org, 2006. 36 pages.

3GPP TS 23.060 v8.1.0 (Jun. 2008), 3rd Generation Partnership Project; Technical Specification Group Services and System Aspects; General Packet Radio Service (GPRS); Service description; Stage 2 (Release 8), Global System for Mobile Communications,http://www.3gpp.org, 2008. 259 pages.

3GPP TS 23.107 v7.1.0 (Sep. 2007), 3rd Generation Partnership Project; Technical Specification Group Services and System Aspects; Quality of Service (QoS) concept and architecture (Release 7), http://www.3gpp.org, 2007. 40 pages.

3GPP TS 23.153 v7.2.0 (Mar. 2007), 3rd Generation Partnership Project; Technical Specification Group Core Network and Terminals; Out of band transcoder control; Stage 2 (Release 7); Global System for Mobile Communications, http://www.3gpp.org, 2007. 77 pages.

3GPP TS 23.228 v8.5.0 (Jun. 2008), 3rd Generation Partnership Project; Technical Specification Group Services and System Aspects; IP Multimedia Subsystem (IMS); Stage 2 (Release 8), http://www.3gpp.org, 2008. 240 pages.

3GPP TS 23.234 v7.7.0 (Jun. 2008), 3rd Generation Partnership Project; Technical Specification Group Services and System Aspects; 3GPP system to Wireless Local Area Network (WLAN) interworking; System description (Release 7), http://www.3gpp.org,2008. 85 pages.

3GPP TS 23.236 v7.0.0 (Dec. 2006), 3rd Generation Partnership Project; Technical Specification Group Services and System Aspects; Intra-domain connection of Radio Access Network (RAN) nodes to multiple Core Network (CN) nodes (Release 7); GlobalSystem for Mobile Communications, http://www.3gpp.org, 2006. 37 pages.

3GPP TS 23.251 v7.0.0 (Jun. 2007), 3rd Generation Partnership Project; Technical Specification Group Services and System Aspects; Network Sharing; Architecture and functional description (Release 7), http://www.3gpp.org, 2007. 18 pages.

3GPP TS 23.401 V8.3.0 (Sep. 2008), 3rd Generation Partnership Project; Technical Specification Group Services and System Aspects; General Packet Radio Services (GPRS) enhancements for Evolved Universal Terrestrial Radio Access Network (E-UTRAN) access (Release 8), Global System for Mobile Communications, http://www.3gpp.org, 2008. 204 pages.

3GPP TS 24.234 v7.5.0 (Mar. 2007), 3rd Generation Partnership Project; Technical Specification Group Core Network and Terminals; 3GPP System to Wireless Local Area Network (WLAN) interworking; WLAN User Equipment (WLAN UE) to network protocols;Stage 3 (Release 7), Global System for Mobile Communications, http://www.3gpp.org, 2007. 32 pages.

(56) References Cited

OTHER PUBLICATIONS

3GPP TS 25,412 v7.1.0 (Jun. 2006), 3rd Generation Partnership Project; Technical Specification Group Radio Access Network; UTRAN lu interface signaling transport (Release 7), http://www.3gpp.org, 2006. 11 pages.

3GPP TS 25.410 v7.0.0 (Mar. 2006), 3rd Generation Partnership Project; Technical Specification Group Radio Access Network; UTRAN lu Interface: general aspects and principles (Release 7), http://www.3gpp.org, 2006. 28 pages.

3GPP TS 25.411 v7.1.0 (Sep. 2007); 3rd Generation Partnership Project; Technical Specification Group Radio Access Network; UTRAL lu interface layer 1 (Release 7), http://www.3gpp.org, 2007. 9 pages.

3GPP TS 25.413 V7.8.0 (Dec. 2007), 3rd Generation Partnership Project; Technical Specification Group Radio Access Network; UTRAN lu interface RANAP signaling (Release 7), http://www.3gpp.org, 2007. 359 pages.

3GPP TS 25.414 v7.1.0 (Sep. 2006), 3rd Generation Partnership Project; Technical Specification Group Radio Access Network; UTRAN lu interface transport and transport signaling (Release 7), http://www.3gpp.org, 2006. 20 pages.

3GPP TS 25.415 v7.3.0 (Dec. 2006), 3rd Generation Partnership Project; Technical Specification Group Radio Access Network; UTRAN lu interface user plane protocols (Release 7), http://www.3gpp.org, 2006. 64 pages.

3GPP TS 25.419 v7.0.0 (Mar. 2006), 3rd Generation Partnership Project; Technical Specification Group RAN; UTRAN lu-BC Interface: Service Area Broadcast Protocol (SABP) (Release 7), http://www.3gpp.org, 2006. 77 pages.

3GPP TS 29.060 V7.11.0 (Sep. 2008); 3rd Generation Partnership Project; Technical Specification Group Core Network and Terminals; General Packet Radio Service (GPRS); GPRS Tunneling Protocol (GTP) across the Gn and Gp interface (Release 7); Global System for Mobile Communications, http://www.3gpp.org, 2008. 145 pages.

3GPP TS 29.060 V8.5.0 (Sep. 2008); 3rd Generation Partnership Project; Technical Specification Group Core Network and Terminals; General Packet Radio Service (GPRS); GPRS Tunneling Protocol (GTP) across the Gn and Gp interface (Release 8); http://www.3gpp.org, 2008. 146 pages.

3GPP TS 29.163 v8.3.0 (May 2008), 3rd Generation Partnership Project; Technical Specification Group Core Network and Terminals; Interworking between the IP Multimedia (IM) Core Network (CN) subsystem and Circuit Switched (CS) networks (Release 8),Global System for Mobile Communications, http://www.3gpp.org, 2008. 237 pages.

3GPP TS 29.232 v8.3.0 (Jun. 2008), 3rd Generation Partnership Project; Technical Specification Group Core Network and Terminals; Media Gateway Controller (MGC)—Media Gateway (MGW) interface; Stage 3 (Release 8), http://www.3gpp.org, 2008. 145 pages.

3GPP TS 29.234 v7.9.0 (Jun. 2008), 3rd Generation Partnership Project; Technical Specification Group Core Network and Terminals; 3GPP system to Wirelss Local Area Network (WLAN) interworking; Stage 3 (Release 7); http://www.3gpp.org, 2008. 92 pages.

3GPP TS 29.332 v8.2.0 (Jun. 2008), 3rd Generation Partnership Project; Technical Specification Group Core Network and Terminals; Media Gateway Control Function (MGCF)—IM Media Gateway; Mn Interface (Release 8), http://www.3gpp.org, 2008. 73 pages.

3GPP TS 29.414 v8.1.0 (May 2008), 3rd Generation Partnership Project; Technical Specification Group Core Network and Terminals; Core network Nb data transport and transport signalling (Release 8), Global System for Mobile Communications, http://www.3gpp.org, 2008. 29 pages.

3GPP TS 29.415 v8.0.0 (May 2008), 3rd Generation Partnership Project; Technical Specification Group Core Network and Terminals; Core Network Nb Interface User Plane Protocols (Release 8), Global System for Mobile Communications, http://www.3gpp.org,2008. 14 pages.

3GPP TS 33.234 v8.1.0 (Mar. 2008), 3rd Generation Partnership Project; Technical Specification Group Service and System Aspects; 3G Security; Wirelss Local Area Network (WLAN) interworking security (Release 8), http://www.3gpp.org, 2008. 10 pages.

3GPP TS 36.300 V8.6.0 (Sep. 2008), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8); http://www.3gpp.org, 2008. 137 pages.

3GPP TS 43.318 v8.1.0 (Feb. 2008), 3rd Generation Partnership Project; Technical Specification Group GSM/EDGE Radio Access Network; Generic Access Network (GAN); Stage 2 (Release 8); Global System for Mobile Communications, http://www.3gpp.org, 2008. 122 pages.

3GPP2—WLAN Interworking, 3rd Generation Partnership Project 2 "3GPP2", 3GPP2 S.R0087-0, Version 1.0, Version Date: Jul. 22, 2004. 19 pages.

International Search Report and Written Opinion issued for corresponding International Patent Application No. PCT/US2008/053464, dated Jul. 17, 2008. 6 pages.

Gundavelli, E. et al., "Proxy Mobile IPv6," RFC 5213, Standards Track, Aug. 2008, 93 pages.

International Search Report and Written Opinion issued for corresponding International Patent Application No. PCT/US2008/081389, dated Dec. 29, 2008, 7 pages.

Narten, T. et al., "Neighbor Discovery for IP version 6 (IPv6)," RFC 4861, Standards Track, Sep. 2007, 98 pages.

* cited by examiner

IP ADDRESS VERSION INTERWORKING IN COMMUNICATION NETWORKS

TECHNICAL FIELD

The present disclosure relates generally to providing support for mixed IP protocol versions in wireless networks by describing systems and methods for network devices that translate between different protocol versions.

BACKGROUND

Internet protocol (IP) is a protocol for communicating data across a packet switched network. The network can include wireless and wire-line portions between a first and a second node. IP provides a unique global addressing method for representing the location of nodes in the network. This allows a first node to send data to a second node by using the IP address of the second node when sending the data. Internet Protocol version 4 (IPv4) uses 32-bit (4-byte) addresses, which limits the address space to 4,294,967,296 possible unique addresses. The next generation IP is IPv6, which supports a larger address space: addresses in IPv6 are 128 bits long versus 32 bits in IPv4. Networking equipment that support IPv4 addresses cannot easily read and route packets based on IPv6 addresses given the differences in length. Thus, an IPv6 message cannot generally be sent over a network that only supports IPv4, and IPv4 messages likewise cannot generally be sent over a network that only supports IPv6. This creates a problem for transitioning networks from IPv4 to IPv6 because it can be very expensive to replace existing networking equipment with new, compatible equipment.

The present disclosure also relates to wireless telephone systems. The first generation of wireless telephone technology used analog mobile phones in which analog information signals were transmitted. As technology has progressed, 2G, 2.5G and 3G systems have developed to handle higher-speed digital packet data, using wireless standards developed by industry consortiums such as the 3rd Generation Partnership Project (3GPP) and the 3rd Generation Partnership Project 2 (3GPP2). The next generation of wireless technology is referred to as 4G technology, based on a standard known as long term evolution-system architecture evolution (LTE-SAE) that uses orthogonal frequency division multiple access (OFDMA) technology.

DESCRIPTION OF EXAMPLE EMBODIMENTS

Overview

Figure 1:
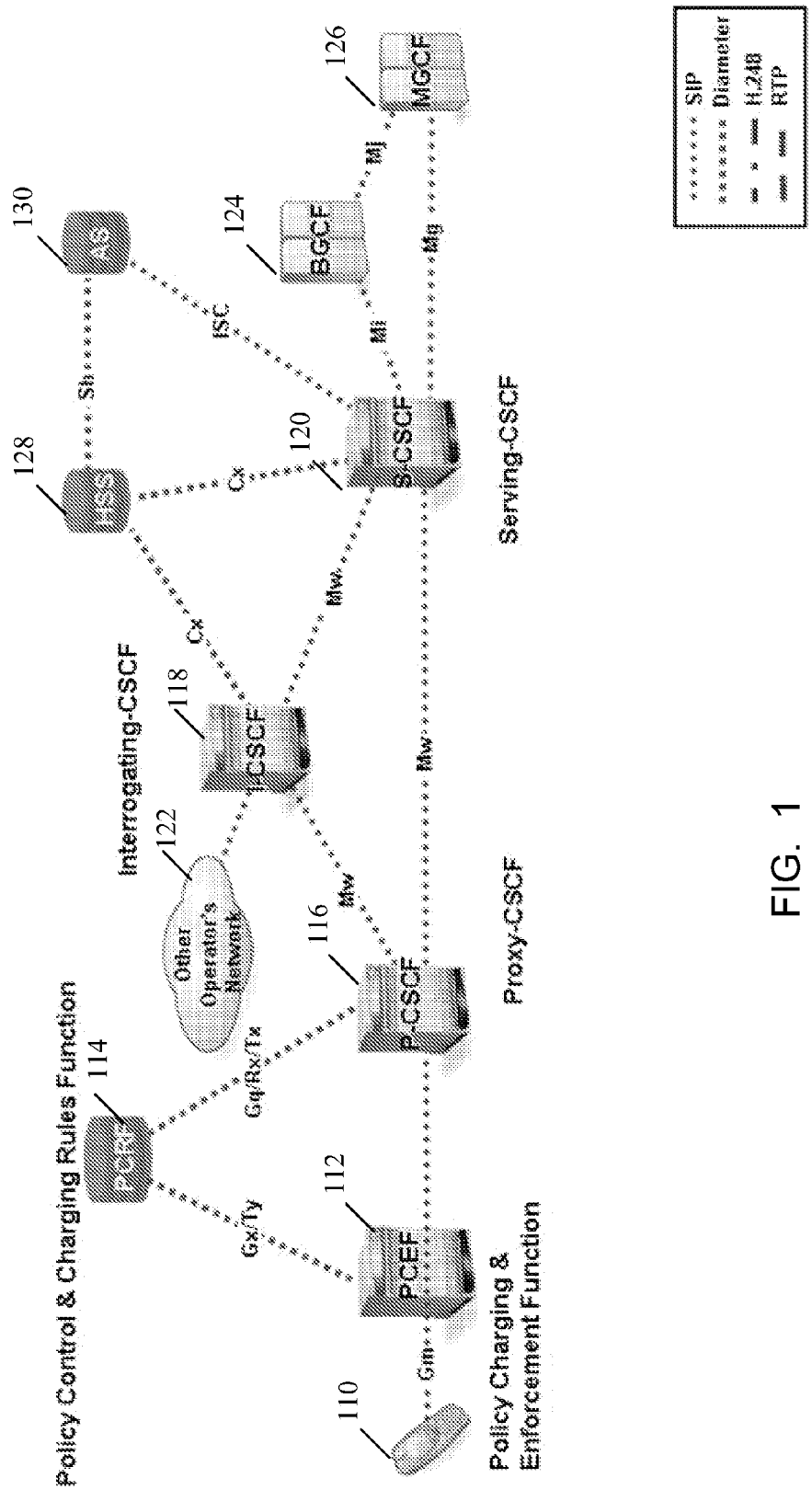
FIG. 1 is a schematic representation of a wireless data network using IPv4 and IP Multimedia Subsystem (IMS) in accordance with certain embodiments.

Systems and methods are provided for supporting IPv4-IPv6 interworking of messages in wireless networks and IMS networks. In one embodiment, a session controller receives a mobility message at from a mobile device for communication on an IP multimedia subsystem (IMS) network using a first IP protocol version, determines whether interworking of the mobility message is needed before forwarding the mobility message, interworks the mobility message at the session controller if needed from the first IP protocol version to a second IP protocol version by substituting, in the mobility message, addresses that conform to the second protocol version, stores an inbound call leg identifier and an outbound call leg identifier in the mobility message, and forwards the mobility message from the session controller to a destination using the second IP protocol version.

Example Embodiments

Interworking can be provided to smooth migration to an all-IPv6 IMS network by allowing the use and support of existing legacy IPv4 infrastructure. This functionality may be provided by a network device such as a call session control function (CSCF) interposed between a user equipment (UE) and an IMS core network with interworking functionality or an interworking module. This device serves as a back-to-back user agent (B2BUA), allocates IP addresses from a pool, performs next-hop route protocol discovery, and maintains and stores information within the gateway as well as interworking and rewriting IP addresses within network messages, while proxying and maintaining sessions between the UE and the IMS core network. A special parameter is embedded within the standard record-route SIP protocol header that enables the gateway to map addresses and sessions of one protocol version to the other, for SIP, SDP, RTP and other types of messages. Various other state information is provided, which together allows for faster call setup, reduced capex/opex, improved debuggability, increased capacity and subscriber density by call processing distribution, and better user experience.

Many modern wireless networks use the IP Multimedia Subsystem (IMS), which provides facilities for delivering multimedia services such as voice calls over the network. IMS is an architectural framework for delivering internet protocol (IP) multimedia to mobile nodes, and provides facilities for delivering multimedia services such as voice calls over the network. A call session control function (CSCF) can manage much of the signaling that occurs in an IMS core. The CSCF functionality can be logically divided into three functionalities: a Proxy CSCF (P-CSCF), an Interrogating CSCF (I-CSCF), and a Serving CSCF (S-CSCF). Additionally, the CSCF functionality is envisioned by two different groups for inclusion in two different topologies: Global System for Mobile Communications (GSM) and CDMA 2000. The 3rd Generation Partnership Project (3GPP) is responsible for IMS which works with GSM systems and the 3rd Generation Partnership Project 2 (3GPP2) is responsible for Multimedia Domain (MMD) which is used with CDMA systems and is based on the 3GPP IMS concept.

The current IMS standards place significant responsibility on application servers to manage the mobile nodes requesting content and services and to communicate within certain parameters. With the fast pace of development, there are a number mobile nodes with varying capabilities as well as a number of application servers with varying capabilities, and all application servers may not be fully IMS-compliant or IPv6-compliant. Thus, a gateway providing v4-v6 interworking as described below may provide faster call setup, reduced capex/opex, improved debuggabilty, better user experience, and increased capacity and subscriber density by call processing distribution.

IP protocol interworking involves translating IPv4 packets into IPv6 packets, and vice versa. The IPv4 protocol is described in RFC 791, which is hereby incorporated by reference herein in its entirety. IPv4 allows for 4,294,967,296 possible unique addresses. This is done using a 32-bit address in the packet header, expressed in dot-decimal notation as the four octets of the address expressed in decimal and separated by periods. IPv6 has a much larger address space of $2^{128}$ addresses, designed to enable IP connectivity to a much larger number of devices such as mobile phones and home appliances, that is represented using a 128-bit address in the packet header. Consequently, IPv4-IPv6 interworking may include a mechanism for translating 32-bit to 128-bit addresses, and vice versa.

IP protocol interworking also involves both IPv4 and IPv6 network devices. A network device that supports a particular network protocol may do so using a protocol stack, which is software implemented on the device that receives and sends packets on a network interface according to the particular protocol. A network device that supports two protocols may be called a dual stack device, as it has one protocol stack for IPv4 and another protocol stack for IPv6.

IMS packet based communications rely on session initiation protocol (SIP) to initiate and control telephone calls. The SIP protocol is widely used on Voice-over-IP (VoIP) networks to control and manage telephony features on a standard IP network, and has been adapted for use with IMS. Among the many uses of SIP are creation, modification and termination of unicast or multicast sessions involving one or several media streams. SIP is designed to be independent of its underlying transport layer, but typically runs on TCP/IP networks. Its headers are similar to Hypertext Transport Protocol (HTTP) headers in that they are embodied in plain text; this allows a network operator to examine SIP packets and route them efficiently and simply.

The six types of SIP requests are INVITE, ACK, BYE, CANCEL, OPTIONS, and REGISTER. The messages are formatted according to RFC 822, containing a header and an optional message body. SIP requests are made in relation to SIP network resources, which are identified by uniform resource identifiers (URIs) in the form sip:username:password@host:port, according to standard Internet conventions. SIP networks also contain proxy servers or proxies, which may interpret, rewrite and/or forward messages; registrars, which accept REGISTER requests and store the accompanying information for a specified domain; and redirect servers, which generate redirect responses directing a client to contact alternate URIs.

A SIP user agent is a logical network endpoint used to create or receive SIP messages, which are either requests from a server or client or responses to such requests. A back-to-back user agent (B2BUA) is a SIP network element that is interposed between a SIP client, such as a phone being used by a user to make a call, and a SIP server, such as the phone of the call recipient. The B2BUA serves as a SIP server and receives the SIP request from the SIP client, and then serves as a SIP client and initiates a new SIP request to the SIP server. This is useful as the B2BUA maintains the complete call state and participates in all call requests, and thereby may provide value-added services to the call. The two connections are handled as two separate call legs by the B2BUA, which maintains references to each of the call legs and may manipulate these to perform administrative and value-added functions. This method is similar to network bridging. In some embodiments, call legs may be referred to as dialogs. In some embodiments, SIP functionality may be implemented in a SIP module. In other embodiments, SIP functionality may be distributed throughout various logical modules in a CSCF.

FIG. 1 illustrates a wireless data network using the IPv4 protocol in accordance with certain embodiments. FIG. 1 includes a user equipment (UE) 110, a policy charging and enforcement function (PCEF) 112, a policy control and charging rules function (PCRF) 114, a P-CSCF 116, an Interrogating-Call Session Control Function (I-CSCF) 111, a Serving-Call Session Control Function (S-CSCF) 120, other operator's network 122, breakout gateway control function (BGCF) 124, media gateway control function (MGCF) 126, a home subscriber server (HSS) 121, and an AS 130. PCEF 112 can be implemented on a network device and on a function such as a Gateway, a GGSN, a packet data gateway (PDG), a packet data interworking function (PDIF), a packet data serving node/home agent (PDSN/HA), or an ASN gateway. In some embodiments, P-CSCF 116 and the policy proxy can be implemented on the same network device. In other embodiments, P-CSCF 116, PCEF 112, and the policy proxy can be implemented on the same network device.

PCEF 112 is located at the gateway, which can be a GGSN, a packet data gateway (PDG), a packet data gateway interworking function (PDIF), a PDSN/HA, and/or an access service network gateway (ASN GW). The PCEF 112 provides service data flow detection and counting as well as online and offline charging interactions. The PCEF 112 can also provide policy enforcement toward the internet protocol-connectivity access network (IP-CAN). PCRF 114 combines flow based charging control and a policy decision function. The PCRF 114 can provision policy and charging control (PCC) rules to the PCEF 112 and inform the application function (AF) on the network device of traffic plane events. The Proxy-CSCF 116 can serve as the first contact point for the user equipment (UE) 110 and forward SIP messages in the network. P-CSCF 116 generates charging call-detail records, maintains a security association with UE 110, and authorizes bearer resource quality of service (QoS) through the application function (AF) toward the PCRF 114. P-CSCF 116 can also provide local service (e.g., 411 service and emergency service), lawful interception, and SIP header compression.

Interrogation-CSCF 118 serves as the first contact between different operator's networks, in some embodiments. The I-CSCF 118 also forwards SIP messages through the network, assigns S-CSCFs to sessions, generates charging call-detail records (CDRs), and provides topology hiding for the network. The Serving-CSCF 120 acts as a SIP registrar and provides IMS user authentication. The S-CSCF 120 loads IMS user profiles from the home subscriber server (HSS), provides person to person (P2P) and person to application (P2A) session control, and SIP application server service control. The S-CSCF 120 provides address translation support, generation of charging CDRs, and lawful interception.

Figure 2:
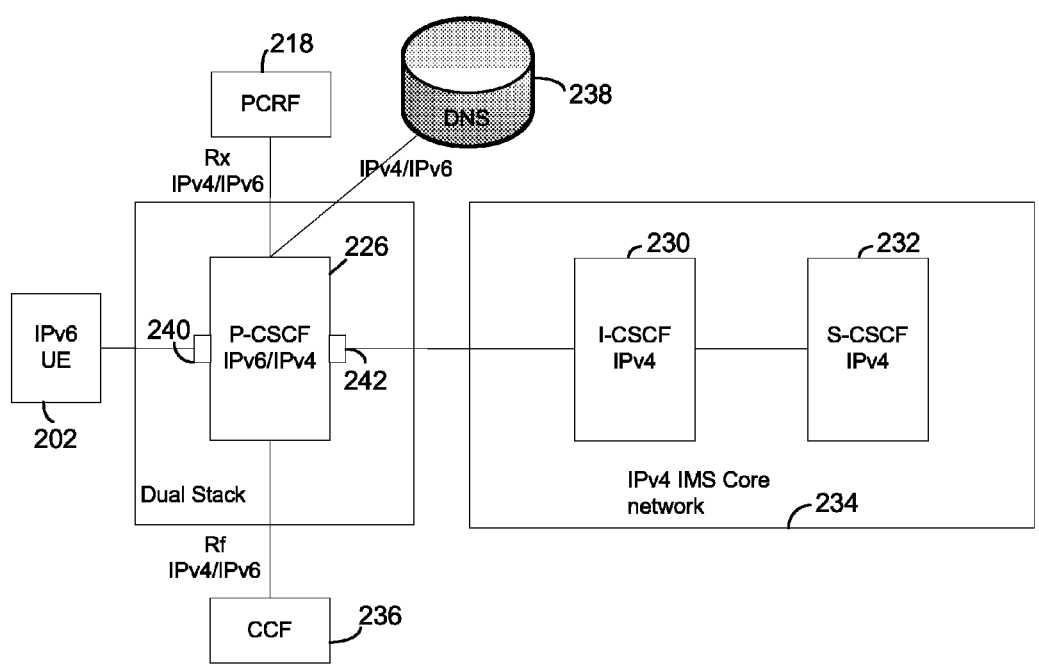
FIG. 2 is a schematic representation of a wireless data network with an IPv6 user equipment (UE) and an IPv4 core network and a dual-stack proxy call session control function (P-CSCF) providing interworking, in accordance with certain embodiments.

FIG. 2 illustrates a representative embodiment incorporating wireless data network 200, where certain elements have been upgraded to enable support for IPv6, such as UE 202, PCRF 218, P-CSCF 226, CCF 236, and DNS 238. I-CSCF 230 and S-CSCF 232 have not been upgraded to enable support for IPv4, so that P-CSCF 226 is required to use IPv4 to communicate with IMS core network 234. Upgraded network elements 218, 226, 236 and 238 may be enabled to support both IPv4 and IPv6 using a dual stack implementation.

To achieve dual-stack behavior, P-CSCF 226 may be configured to use two access services with a first access service, V6-SVC 240, listening on an IPv6 address and a second access service, V4-SVC 242, listening on an IPv4 address and port. Requests may be forwarded to and from peer access services. Call legs may also be created at access services. Access services may be implemented as hardware and/or software modules, or as a combination thereof. When UE 202 sends SIP network messages to P-CSCF 226 to make use of IMS core network 234, the messages are transmitted and received at V6-SVC 240 using IPv6. These messages are forwarded to IPv4 IMS core network 234 through V4-SVC 242. Similarly, messages from IPv4 core network 234 are received at V4-SVC 242 and forwarded to IPv6 UE 202 via V6-SVC. Dual-stack P-CSCF 226 is thus acting as a B2BUA.

Domain name service (DNS) servers may also be dual-stack devices compatible with both IPv4 and IPv6, and may permit DNS queries for both IPv4 and IPv6 addresses. IPv4 DNS addresses are referred to as A records, and IPv6 DNS records are referred to as AAAA records. DNS lookups for IP addresses thus may provide information about whether a given host is compatible with IPv4 or IPv6 by the presence or absence of A records and AAAA records. Similarly, network routing tables maintain lists of IP addresses, which may be IPv4 addresses or IPv6 addresses. The presence of an IPv4 or IPv6 address in determined by analysis of the address itself. Deep packet inspection may also be used to inspect packets, packet headers, or other envelope information for packets received by the gateway or packets in transit through the gateway.

To identify the need for v4/v6 interworking for a new incoming IPv6 SIP REGISTER request or other SIP request arriving at V6-SVC 240, an IP route lookup may be performed based on the request universal resource identifier (URI) provided in the SIP request. The DNS route lookup is performed first in the V4-SVC context, and if the first lookup does not return any matching route entry, then in the V6-SVC context. If a matching IPv4 next-hop route entry is found, this indicates that interworking needs to be performed. If no route entry is found, then a DNS query to dual-stack DNS server 238 on the request-URI domain is done for both IPv4 A records and IPv6 AAAA records. If this DNS response yields only an IPv4 address then a determination is made to perform v4/v6 interworking in this case as well. The subscriber call leg will be updated by P-CSCF 226 with an indication that v4/v6 interworking is required for this subscriber.

On identifying the need for interworking, interworking is performed as follows. As P-CSCF 226 is acting as a B2BUA, SIP headers such as Via, Contact, Service-Route, Path etc. are automatically set to the IPv4 address and port of V4-SVC 242. The Contact header may be replaced with an IPv4 address allocated for a current session manager from an IPv4 address pool configured under V4-SVC 242. Similarly, the port number for the address placed in the Contact header may also be allocated from a pool. Finally, the request is forwarded through the outgoing call leg via V4-SVC 242. UE 202's IPv6 address may be stored in a database, cache or other storage medium for later use. Network address translation (NAT) may be used in certain embodiments to allocate either IPv4 or IPv6 addresses from a pool of addresses. In addition, a pair of custom SIP Record-Route headers is added, with the top Record-Route header containing an identifier for the outbound call leg and the bottom Record-Route header containing an identifier for the inbound call leg. A X-ST-CID custom parameter is used to tag or identify these Record-Route headers for later identification by the CSCF; this parameter is appended to the route URI, e.g. "Record-Route: <sip:www-.starent.com; X-ST-CID>" or equivalent.

In some embodiments, full or partial IPv4-IPv6 interworking functionality may be made available for a CSCF acting as a proxy instead of as a B2BUA. In this case, interworking is supported only for the Signaling path and not for the Media path.

Interworking in the reverse direction may operate as follows. The destination IPv4 address in the SIP Path header received from S-CSCF in the 200 OK response for the REGISTER message may be replaced with V6-SVC's previously-stored IPv6 address before forwarding to UE 202. Some UEs may use the Path header to send further requests to P-CSCF 226. Adding the IPv6 address in the Path header will help IPv6 UE 202 in correctly sending requests to V6-SVC 240. The Service-Route received in the header of the 200 OK message corresponding to the UE 202's REGISTER message, along with the v4-v6 indication stored at P-CSCF 226, may be used to route all further requests coming from IPv6 UE 202 towards IPv4 S-CSCF 232 via V4-SVC 242. Any terminating call coming towards IPv6 UE 202 will arrive at V4-SVC 242 and will then be routed to IPv6 UE 202 via V6-SVC 240. In addition, the same pair of custom SIP Record-Route headers is added, with the top Record-Route header containing an identifier for the outbound call leg and the bottom Record-Route header containing an identifier for the inbound call leg, together with the X-ST-CID custom parameter.

The CSCF can include a mapping table of inbound and outbound identifiers. The table includes an organization of the identifier information along with information used for interworking such as IP addresses and session information. When an inbound identifier is detected on a message received on the inbound or outbound call leg, the appropriate identifier is used to match the packet data unit (PDU) to the appropriate session. The match also provides the CSCF with information to determine how to handle the PDU in the CSCF. Once a match is made, the PDU can be sent to the session for processing or can be sent to an interworking module. In some embodiments, this functionality is implemented in the session module. In some embodiments, the session performs the interworking and in other embodiments the session provides information for the interworking module to perform the interworking on the PDU. This information can include the interworking to perform and the IP addresses to use.

The mapping table is populated with information as call sessions are created. In the process of setting up a call session, the CSCF determines that the call legs include different protocols and interworking is to be performed on received PDUs. The CSCF assigns the inbound and outbound identifiers for the session and the IP addresses involved in the interworking. This information along with the session identification can be included in the mapping table. As a PDU is received on a call leg, inspection of the packet, such as shallow packet inspection, reveals the inbound and outbound identifiers. A lookup is then performed in the mapping table to obtain session information as well as other information regarding the interworking. Once this information is obtained, modifications to the PDU can be performed to replace the IP address and other information to prepare the PDU for transmission on a communication network with a different protocol. The mapping table can be implemented in memory and the inspection can be performed using a processor.

This general interworking capability may be referred to as bridging in some embodiments. The service description protocol (SDP), real time protocol (RTP) and session initiation protocol (SIP) routines in the interworking device may be modified so that software services, clients, agents and modules that utilize IP packets and plaintext protocol headers will produce headers that transparently include either IPv4 or IPv6 addresses as needed. This may be implemented by defining a data type that contains an IP address, "sn_ip_addr_t," and automatically determining the protocol version of the data type so that functions using this data type will generically handle both IPv4 and IPv6 addresses.

If IMS core 234 is identified by procedures like DNS etc., to support IPv6, then V6-SVC 240 may communicate with it directly over IPv6 without requiring any interworking. Similarly, when V4-SVC 242 receives requests from IPv4 UEs, it may communicate with IPv4 IMS core network over IPv4. Various components of the wireless network have been omitted for clarity. These components may provide IP connectivity to the UE 202 using the same IP protocol version as the UE 202, or may support multiple IP protocol versions including the IP protocol version supported by the UE 202.

It is also possible for the IMS core network to be implemented where the I-CSCF and S-CSCF are physically located on devices or networks that are dual-stack and/or are compatible with IPv6, even if the I-CSCF and S-CSCF are implemented as functions or modules that are only compatible with IPv4 and not IPv6. In this case, it may still be necessary for the P-CSCF to perform interworking to and from IPv4 and IPv6.

Figure 3:
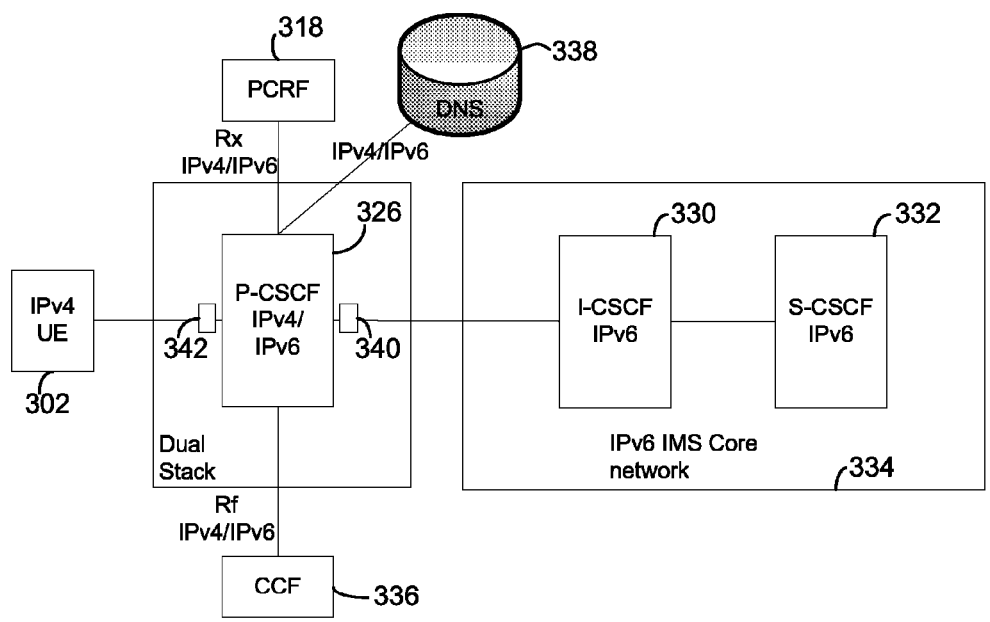
FIG. 3 is a schematic representation of a wireless data network with an IPv4 UE and an IPv6 core network and a dual-stack P-CSCF providing interworking, in accordance with certain embodiments.

FIG. 3 illustrates interworking on a wireless network 300 between a UE 302 using IPv4 and an IMS core network 334 using IPv6. The UE 302 communicates with P-CSCF 226 via a radio access network (not shown) compatible with IPv4. P-CSCF 226 implements both IPv4 and IPv6 according to a dual-stack implementation, using IPv4 to communicate with the UE and IPv6 to communicate with IPv6-compatible IMS core network 334. Accordingly, UE 302 sends messages to IPv4-compatible interface V4-SVC 242 on P-CSCF 226. Upon receiving messages in IPv4, P-CSCF 326 determines whether the destination network is compatible with IPv4, or if interworking is needed, using a DNS-based procedure similar to that described above, or another procedure. P-CSCF 226 in FIGS. 2 and 3 may also be preconfigured with information regarding the compatibility of different network elements with IPv4 and IPv6, possibly stored in a database or other data store.

Figure 4:
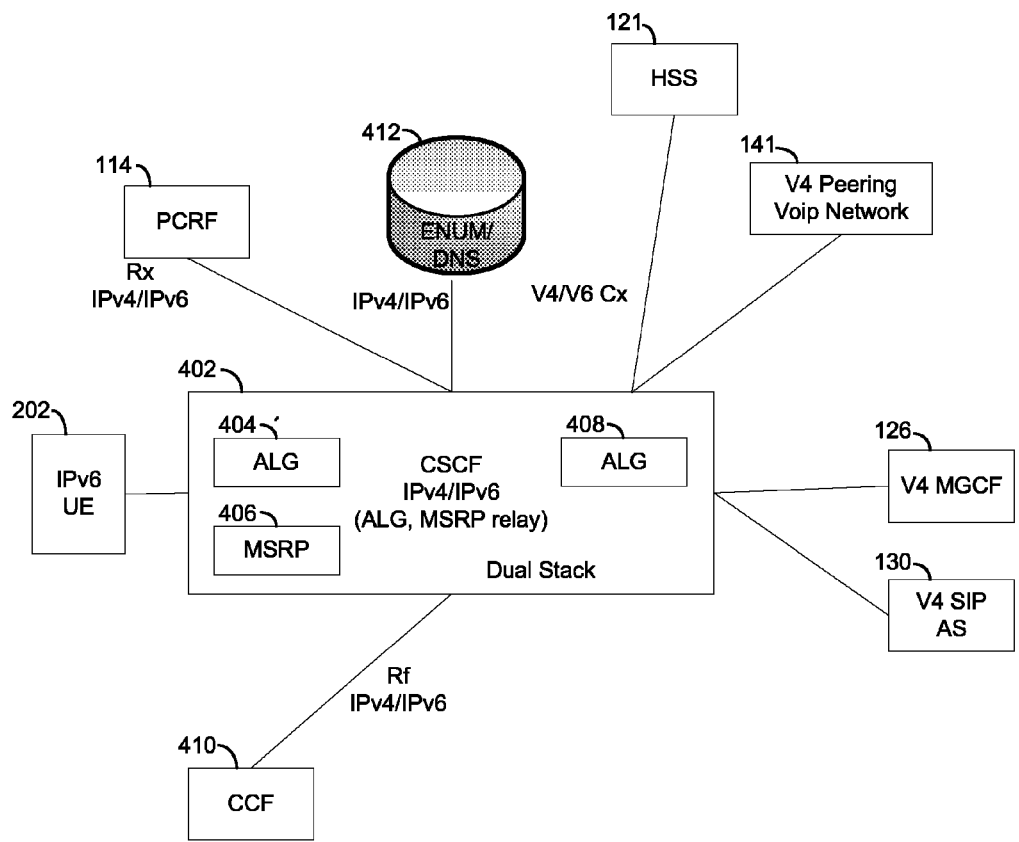
FIG. 4 is a schematic representation of a wireless data network with an integrated application level gateway (ALG) and message session relay protocol (MSRP), in accordance with certain embodiments.

FIG. 4 illustrates a dual stack CSCF 402 with an integrated application layer gateway (ALG) 404 and an message session relay protocol (MSRP) relay 406, in accordance with certain embodiments. CSCF 402 is able to send and receive IP packets and flows over both the IPv4 and IPv6 protocol, as well as IPv4 and IPv6 SIP messages. CSCF 402 may be a P-CSCF, a S-CSCF, or an I-CSCF. CSCF 402 also contains an interworking module 408. Also present on the network are call charging function (CCF) 410, policy charging and rules function (PCRF) 114, ENUM/DNS server 412, Home Subscriber Server (HSS) 121, media gateway control function (MGCF) 126, and SIP application server (AS) 130. CSCF 402 is connected to a peering network/VoIP network 414, which is capable of IPv4 only. UE 202 communicates with CSCF 402 using the IPv6 protocol. Messages from UE 202 are interworked by interworking module 408. With the use of interworking module 408 integrated into CSCF 402, it is possible for interworking module 408 to interwork various different kinds of messages, such as SIP messages, application level messages, MSRP messages, and other messages to and from IPv4 and IPv6.

Call Flows at P-CSCF

Figure 5:
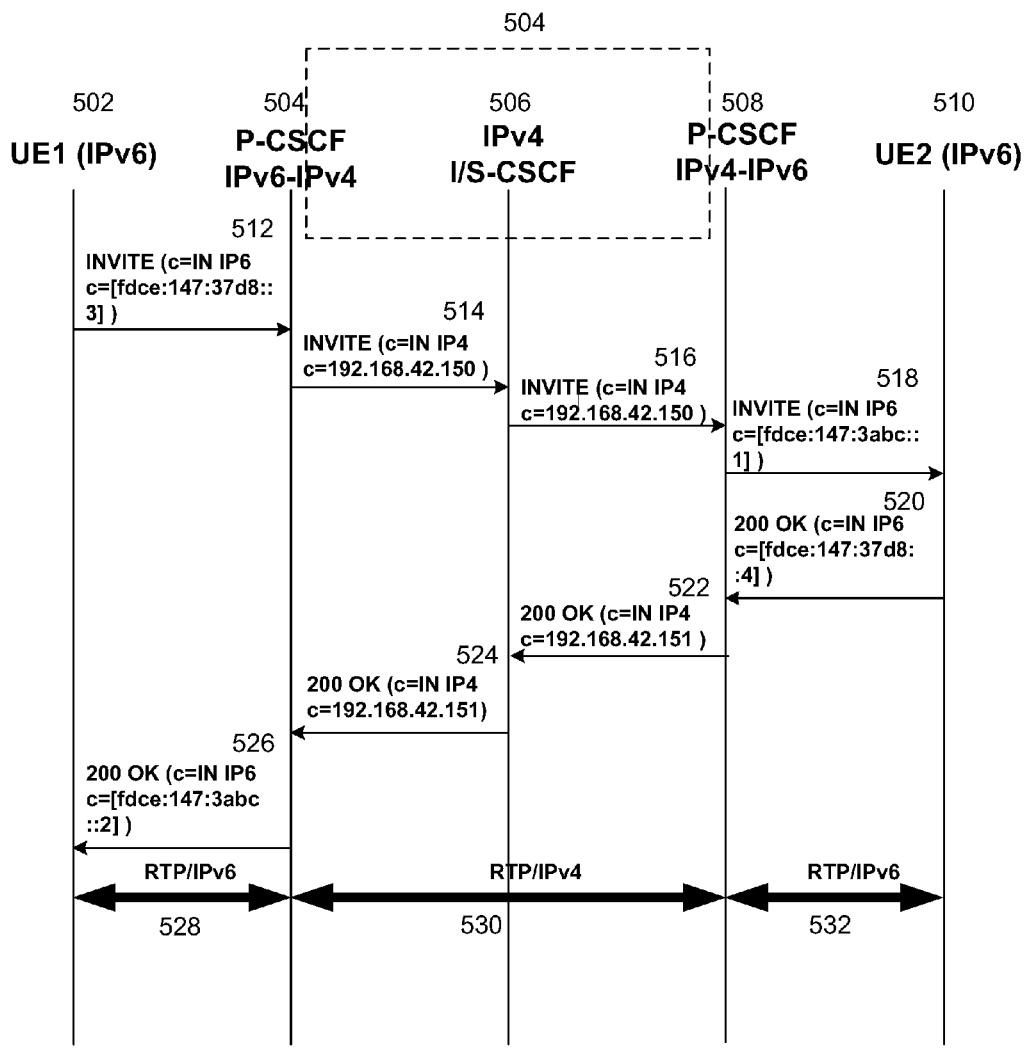
FIG. 5 is a signaling diagram of a wireless data network with a dual-stack proxy call session control function (P-CSCF) providing interworking, in accordance with certain embodiments.

FIG. 5 is a signaling call flow diagram for a connection 500 between a first UE 502 and a second UE 510 via IMS core 506 in accordance with certain embodiments. Both UE 502 and UE 510 support IPv6, but IMS core 506 does not support IPv6 and only supports IPv4. In this example scenario, it is clear that P-CSCF 504 and P-CSCF 506 must both perform IPv4-IPv6 interworking. At step 512, an SIP request is initiated using IPv6 by the first UE 502. Alternatives to SIP may be used in some embodiments. The SIP request is an INVITE request containing a destination address in a Contact: header, which is shown as the text in brackets at 512. This may be the same as the request-URI. In step 512, the label "c=IN IP6 c=[fdce:147:37d8::3]" refers to the "c=" line in the SDP body of the INVITE. This IP address is where the originating UE expects other UE to send media, such as audio or video in RTP messages. Once the INVITE request 512 is received by P-CSCF 504, the message destination is evaluated using a method such as the method above, and P-CSCF 504 determines that the message requires interworking to go to the next level of the SIP call hierarchy. The P-CSCF 504 thus performs IPv6-IPv4 interworking, resulting in message 514. Other headers such as Via, Path, etc. are automatically set by the P-CSCF in B2BUA mode.

Message 514 is the same INVITE message with the addition of the address having been interworked from an IPv6 address to an IPv4 address. The IPv4 address in message 514 may be allocated by P-CSCF 504 according to an algorithm or by random selection from a pool of potential IP addresses, which may be configured by the network operator. There are also various other possible ways for interworking IPv6 addresses to IPv4 addresses. However, interworking of IPv6 addresses to IPv4 addresses must take into account the fact that the IPv6 address space is several orders of magnitude larger than the IPv4 address space. As well, the mapping of IPv6 to IPv4 addresses (and vice versa at P-CSCF 508) may be retained and stored in a database or other storage medium in some embodiments.

IPv4-compatible message 514 is passed from P-CSCF 504 to IPv4-compatible IMS core 506, which may contain an I-CSCF and a S-CSCF. IMS core 506 routes the message appropriately to P-CSCF 508. Although P-CSCF 508 supports IPv6 as well as IPv4, it is not necessary to interwork the message, since IMS core 506 is compatible with both protocols. However, once the message reaches P-CSCF 508, P-CSCF 508 performs a test of UE 510, according to the DNS-based procedure described above or according to another procedure. The test indicates that UE 510 does not have the capability to receive messages in IPv4, so P-CSCF 508 interworks the message from IPv4 to IPv6. This is reflected in message 518 as the IP address is no longer an IPv4 address but an IPv6 one.

In the reverse direction, UE 510 sends out a 200 OK message. The message contains an IPv6 target address, which is received and interworked at P-CSCF 508; the address is initially obtained from the packet header of the SIP message 512 issued by UE 1 (502). P-CSCF 508 checks the target address against a list of mappings for IPv4 and IPv6, and if the address is found, uses the correct IPv4 address to interwork the IPv6 address. If the address is not found, the P-CSCF has the liberty to assign a new address, as it is acting as a B2BUA and need not use the same addresses for each call leg. Note that the IPv4 addresses from the INVITE messages 514, 516 are the same, while the IPv6 address in message 512 and that in message 518 are significantly different. This may be due to differing algorithms or random algorithms for interworking at the P-CSCFs 504, 508. The 200 OK message continues across the IMS core 506 in IPv4, as seen in messages 522 and 524. Once message 524 reaches P-CSCF 504, P-CSCF 504 makes a determination using a DNS query, a database lookup or other means that the UE requires packets to be sent in IPv6, and correspondingly interworks the message from IPv4 to IPv6 526.

The heavy arrows 528, 530, 532 at the bottom of FIG. 5 illustrate the fact that there is an RTP relay or RTP tunnel 528 between UE 502 and P-CSCF 504 using the IPv6 protocol, another RTP tunnel 530 between P-CSCF 504 and P-CSCF 508 via IMS core 406 using the IPv4 protocol, and a third RTP tunnel 532 between P-CSCF 508 and UE 510 that uses IPv6. RTP tunnel 530 uses IPv4 not for the P-CSCFs 504, 508, which are both dual-stack implementations, but for the benefit of IMS core 506 which has not been upgraded to handle IPv6. Other implementations and embodiments may be envisioned with different network nodes substituted, but the principle for SIP and VOIP interworking is the same.

Figure 6:
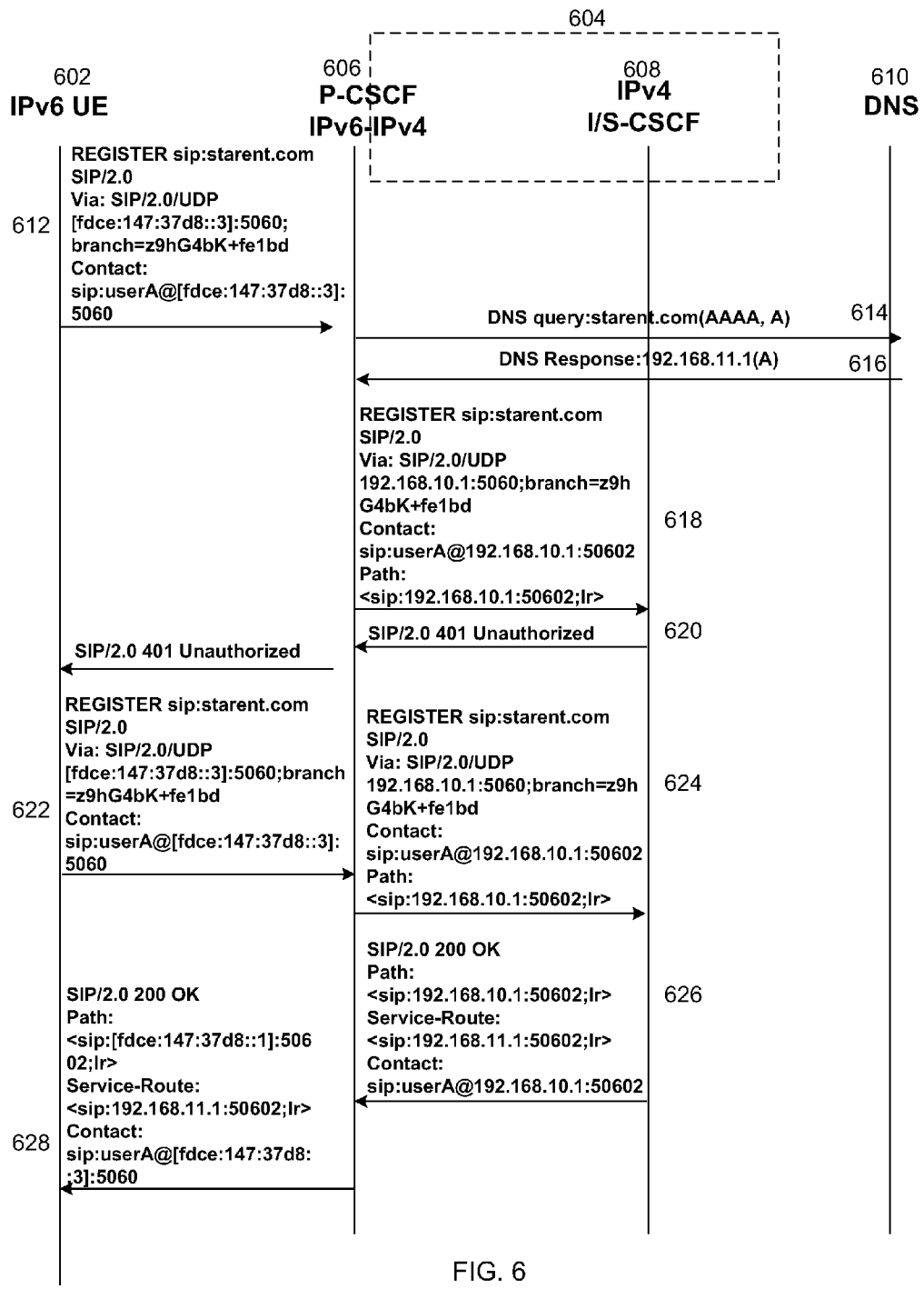
FIG. 6 is a signaling diagram of registration signaling for an IPv6 UE registering with an IPv4 IMS core network, in accordance with certain embodiments.

FIG. 6 is a call flow diagram for an IPv6-compatible UE 602 registering with an IPv4-compatible IMS core network 604 in accordance with certain embodiments. P-CSCF 606 is a dual-stack P-CSCF, capable of receiving and sending messages using both IPv4 and IPv6, and is also capable of interworking between IPv6-compatible UE 602 and IPv4-compatible I/S-CSCF 608, which is part of IMS core network 604. DNS server 610 may be capable of communicating via either IPv4 or IPv6 for the purposes of this diagram, depending on whether it is connected to an IPv4 or an IPv6 network. The DNS service (not shown) running on DNS server 610 may be configured to respond to IPv6 DNS requests, or it may be configured to ignore them. The DNS service is configured to respond to IPv4 DNS requests.

Steps 612-620 show UE 602 sending a SIP registration request for registration with IMS core network 604 that is rejected as unauthorized. In registration request 612, UE 602 is attempting to register with SIP registrar server starent.com at the URI "sip:userA@[fdce:147:47d8::3]:5060," where this URI is the URI at which the UE will receive calls. The string "[fdce:147:47d8::3]" is an IPv6 address. In step 614, P-CSCF 606 receives request 612 using IPv6 at access service V6-SVC (not shown). At this stage, P-CSCF 606 has not determined whether interworking is needed for target IMS core network 604. In order to determine this it performs a DNS lookup on the domain name "starent.com." The DNS query contains a request for IPv6 addresses (AAAA records) as well as for IPv4 addresses (A records), and is sent using either IPv4 or IPv6 to DNS server 610 based on a network routing table at P-CSCF 606. In step 616, DNS server 610 responds to request 614 with an IPv4 address. The absence of an IPv6 address where one was requested is interpreted by dual-stack P-CSCF 606 as an indication that IMS core network 604 and I/S-CSCF 608 do not support IPv6. This results in access service V6-SVC (not shown) at P-CSCF 606 then forwarding the request to peer access service V4-SVC (not shown), also at P-CSCF 606, which performs interworking on the outgoing request 612 before it is proxied to I/S-CSCF 608.

At access service V4-SVC (not shown) at P-CSCF 606, a new call leg is created and a "v4v6_interworking" flag on the call leg is set. Two flags may be used in some embodiments; the call leg may also be created before forwarding to V4-SVC. In interworking, all IPv6 IP addresses and ports have been removed and replaced with IPv4 addresses, resulting in interworked request 618. Various SIP headers that are interworked include VIA, CONTACT, PATH and SERVICE-ROUTE. To facilitate repeated interworking between UE 602 and IMS core network 604, P-CSCF 606 may maintain a mapping between the IPv6 addresses requested by the UE 602 and the translated IPv4 addresses contained in proxied request 618. In addition, a custom parameter for interworking (not shown) is stored at the gateway and also added to the SIP header via a pair of standard RECORD-ROUTE headers. The topmost RECORD-ROUTE header is made to contain an identifier for the inbound call leg (e.g. a callLegID) and the bottommost header is made to contain an identifier for the outbound call leg. The custom parameter X-ST-CID is used in conjunction with the call leg ID in the RECORD-ROUTE headers. The outbound call leg ID and custom X-ST-CID parameter is also added to the SIP Via: header.

In step 620, I/S-CSCF 608 responds to request 618 by rejecting it as unauthorized, and P-CSCF 606 forwards the response to UE 602. Request 618 and response 620 are also an example of P-CSCF acting as a B2BUA. To serve as a proxy, P-CSCF 606 receives a request from UE 602 and performs a back-to-back request to I/S-CSCF masquerading as a user agent.

Steps 622-628 show UE 602 successfully registering with IMS core network 604 at a subsequent time. Step 622 shows a registration request identical to that shown in step 612. Step 624 shows P-CSCF 606 interworking the request and proxying it to I/S-CSCF 608. Since this registration takes place at a subsequent time, no DNS request is necessary, so steps 614 and 616 are omitted. P-CSCF 606 has also previously determined that requests to I/S-CSCF 608 must be interworked to IPv4, and this information may be stored in a flag or data structure in the call leg data structure. P-CSCF 606 may refer to a previously-created mapping between the IPv6 address requested by the UE 602 and the translated IPv4 addresses contained in proxied request 618 to perform IPv6-IPv4 interworking on request 624. Step 626 is a 200 OK response from I/S-CSCF 608 permitting UE 602 to register with IMS core network 604. In step 628, P-CSCF performs interworking on the response and forwards the request to UE 602.

Figure 7:
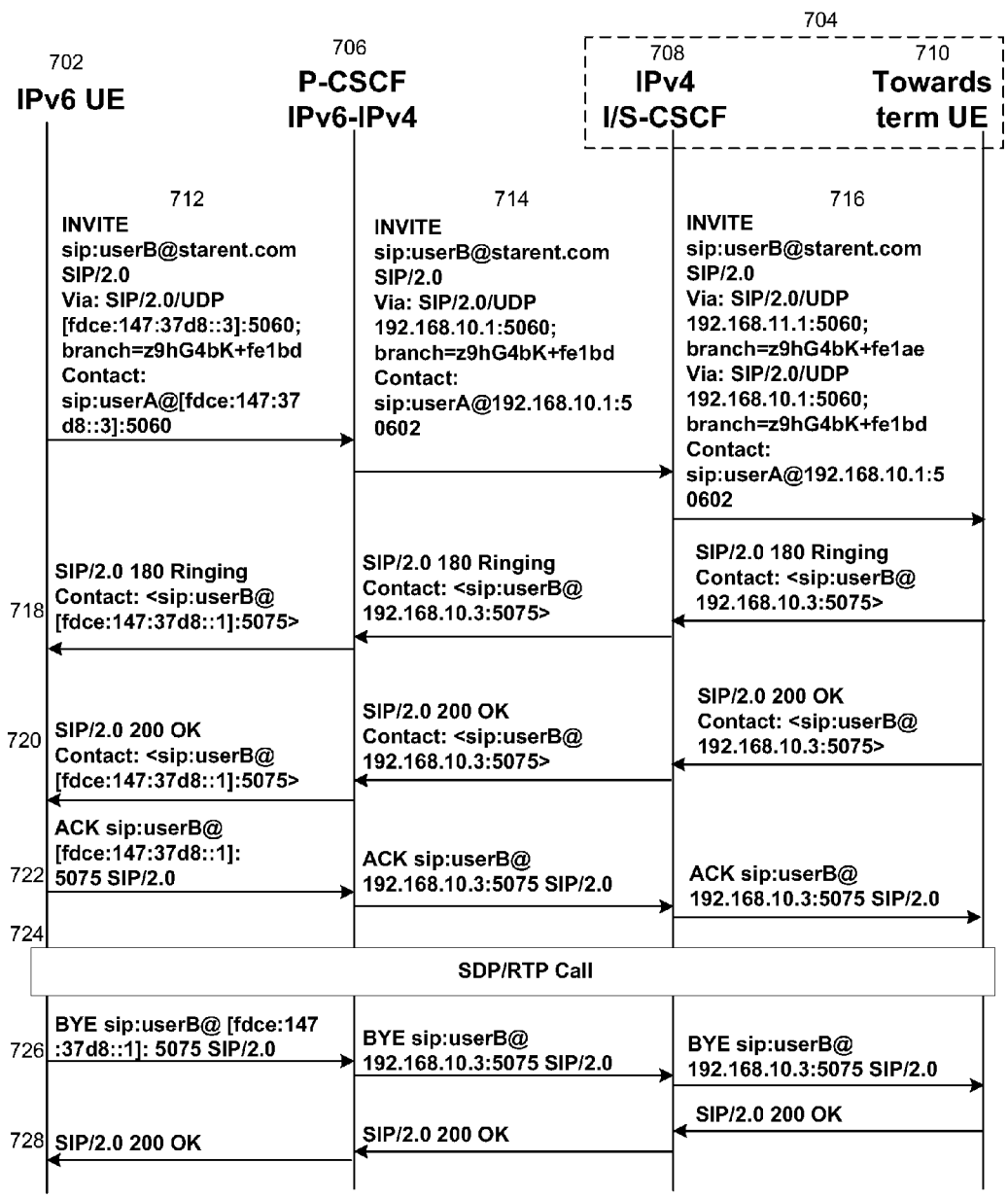
FIG. 7 is a signaling diagram of call signaling for an IPv6 UE originating a call towards an IPv4 IMS core network, in accordance with certain embodiments.

FIG. 7 is a call flow diagram for an IPv6 UE 702 originating a voice-over-IP (VoIP) call over an IPv4 IMS core network 704 in accordance with certain embodiments. In the depicted scenario, IPv6-compatible UE 702 has previously associated with P-CSCF 706 and I/S-CSCF 708. P-CSCF 706 is a dual-stack P-CSCF capable of IPv4-IPv6 interworking, as described above. In step 712, UE 702 issues a SIP INVITE request to P-CSCF 706. The SIP INVITE request has various header fields incorporating IPv6 addresses in its SIP header, such as the depicted Via and Contact header fields. In the diagram, IPv6 UE 702 has the IPv6 IP address [fdce:147: 37d8::3], and this address is provided in the Via: field of the SIP header. P-CSCF 706 receives the SIP INVITE request at access service V6-SVC (not shown), and checks the v4v6_interworking flag in the call leg. Since in this case IMS core network 704 supports only IPv4 and not IPv6, the flag is set. P-CSCF 706 forwards the SIP INVITE request to access service V4-SVC (not shown), which interworks the message to IPv4, thereby changing the Via: address of UE 702 to 192.168.10.1:5060, and sends it as shown in step 714. The IPv4-compatible message is received by IPv4 I/S-CSCF 708, which appends its IPv4 address, 192.168.11.1:5060, and branch, "z9hG4bK+fe1ae," to the SIP Via: header. The I/S-CSCF then passes the message at step 716 along the IMS core network 704 towards a terminating UE 710 (the UE itself is not shown).

Step 718 shows a SIP 180 Ringing response message as it is received from IPv4 IMS core network 704, passed to P-CSCF 706 and received at access service V4-SVC, passed to access service V6-SVC and interworked, and finally sent from P-CSCF 706 to UE 702 using IPv6. Step 720 shows a SIP 200 OK response message as it is received and passed along to UE 702 following the same process as in step 718. Step 722 shows a SIP ACK response as it is sent from the UE 702 using IPv6 to P-CSCF 706 and received at access service V6-SVC, passed to access service V4-SVC and interworked, and finally sent to IMS core network 604 and towards terminating UE 710 using IPv4.

Once an SIP connection is made as described above, step 724 represents various session description protocol (SDP) and real time protocol (RTP) transactions and flows that take place to enable a VoIP call over the SIP connection. SDP is used between hosts to advertise streaming media initialization parameters and enables the use of other protocols such as RTP and real time streaming protocol (RTSP). These parameters include IP addresses and port numbers, and must also be interworked. SDP headers also contain a network type flag, which must be changed from "IP6" to "IP4" or vice versa during interworking P-CSCF 706 interworks outgoing SDP message headers from UE 702 from IPv6 to IPv4, and incoming SDP message headers from IMS core network 704 from IPv4 to IPv6. Any IP addresses and ports in the SDP message headers must be replaced with IP addresses from locally configured IP pools of the appropriate IP version, and must be consistent with the IP addresses already sent in SIP initialization. P-CSCF 706 must also interwork outgoing and incoming message headers for the VoIP call itself, which uses RTP.

On implementations of P-CSCF 706 that include hardware or software modules such as network processing units (NPUs) or network processing unit flows (NPU flows), a special type of NPU flow, designated IPV6UDP_FLOW, may be installed for each media stream or RTP packet stream coming from UE 702. This NPU flow may have as parameters the IPv6 address received in the SDP headers from UE 702 as the source IP and the IPv6 address corresponding to terminating UE 710 that has been allocated from a pool of IPv6 addresses by access service V6-SVC as the destination IP. A new callback function may be implemented in an application programming interface (API) or system library such that a flow of this special type may be created for media. When a RTP packet stream is received from UE 702 at the P-CSCF 706, this callback function may interwork the RTP packet streams with IPv4 source and destination addresses corresponding to the terminating UE 710 and forward the received RTP over IPv4 to the IPv4 IMS core network 704. RTP statistics and counters for media loss detection may be handled by such a callback function, or using other functions implemented in alternative layers of the protocol stack on P-CSCF 706.

Step 726 shows a SIP BYE response message, issued when UE 702 hangs up the phone, as it is received by P-CSCF 706, interworked and sent along towards terminating UE 710 following the same process as in step 722. Step 728 shows a 200 OK response message being sent from IMS core network 704 to UE 702. Since the SIP header for this message does not contain IPv4 or IPv6 addresses, no interworking of SIP headers is needed. However, the message is still received over IPv4 at V4-SVC at P-CSCF 706 and has an IPv4 IP header which requires forwarding to V6-SVC and interworking of the IP header to IPv6 at P-CSCF 706 before forwarding to UE 702. This may be handled automatically by the underlying IP dual-stack of P-CSCF 706 in some embodiments.

Figure 8:
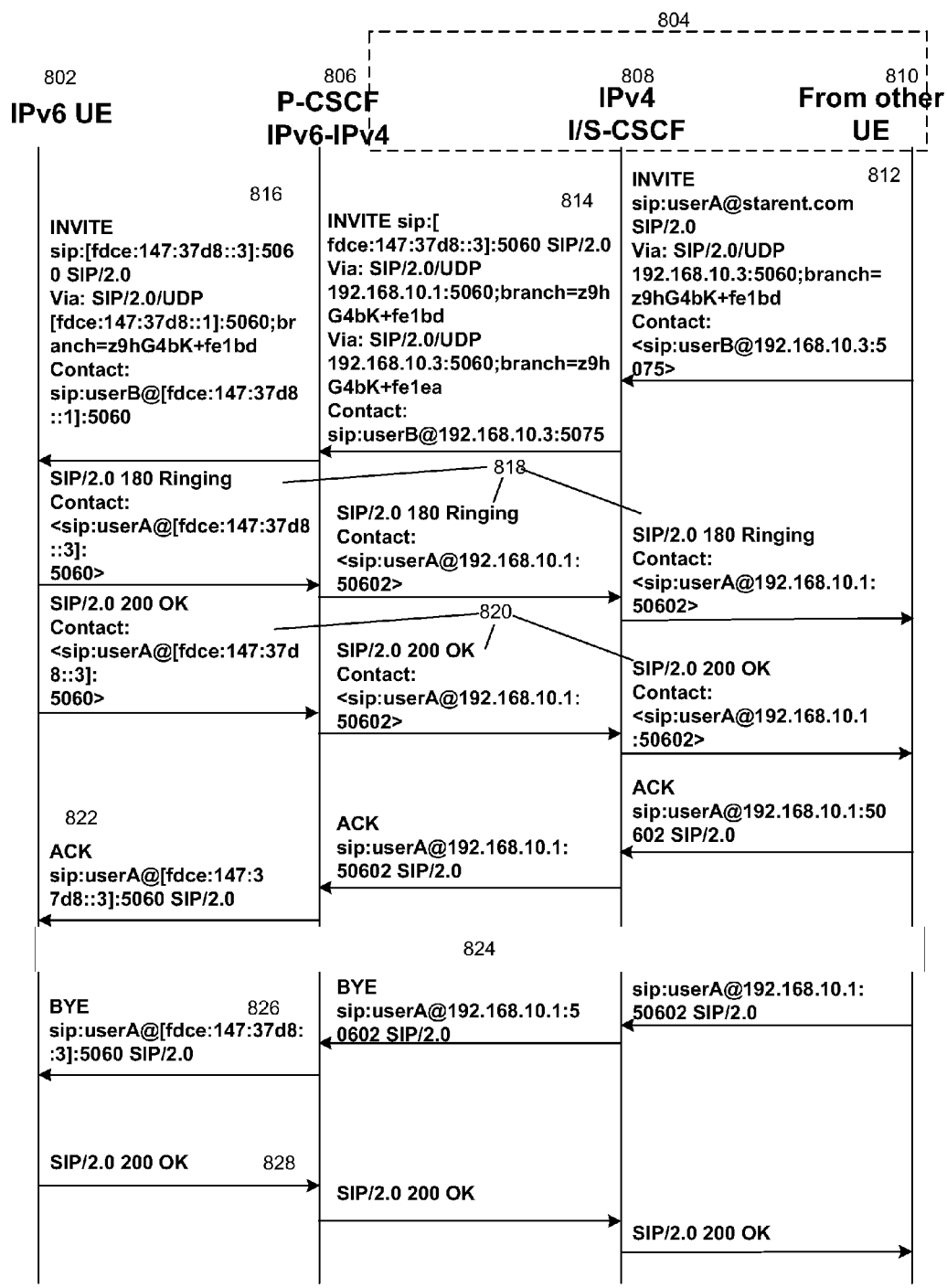
FIG. 8 is a signaling diagram of call termination for a call terminating at an IPv6 UE from an IPv4 IMS core network, in accordance with certain embodiments.

FIG. 8 is a call flow diagram for a call initiated by another UE 810 on an IPv4 IMS core network 804 terminating at an IPv6 UE 802, in accordance with certain embodiments. The call is initiated from another UE 810 by the transmission of an SIP INVITE request 812. The SIP INVITE request 812 contains the request-URI of IPv6 UE in the INVITE field, which may be an unresolved DNS name and may be neither an IPv4 address nor an IPv6 address. Any IP addresses in the SIP header, such as in the Via: field, are IPv4 addresses as depicted in the diagram. The I/S-CSCF appends an entry to the SIP Via: field corresponding to its own IP address. At step 814, the request is received by I/S-CSCF 808, which is capable of IPv4 but not IPv6, and then forwarded to P-CSCF 806, which is a dual-stack device capable of interworking. P-CSCF 806 receives request 812 at access service V4-SVC (not shown), forwards it to access service V6-SVC (not shown), and performs interworking at V6-SVC. During interworking, P-CSCF 806 resolves the DNS name of UE 802, here "starent.com," using the AAAA record for starent.com at an IPv6-capable DNS server (not shown). P-CSCF 806 also interworks the Contact: header from the IPv4 address given by I/S-CSCF 808 to a new IPv6 address, "[fdce:147:47d8:: 1]:5060," and stores the mapping in a database, data store, memory, or other storage means. P-CSCF 806 may also replace all of the IPv4 SIP Via: header entries with a single entry containing the IPv6 address of P-CSCF 806 itself. Finally, at step 816, P-CSCF 806 forwards the request to IPv6-capable UE 802.

Step 818 shows a SIP 180 RINGING message, issued when UE 802 is ringing. It contains the contact information for UE 802 in the Contact: field, which is interworked by P-CSCF 806 from IPv6 to IPv4 in the same manner described above and then forwarded to other UE 810. Similarly, step 820 shows a SIP 200 OK message, issued once UE 802 picks up the phone. The message is interworked by P-CSCF 806 in the same manner described above and then forwarded to other UE 810. Step 822 shows a SIP ACK message, issued by other UE 810 in response to the SIP 200 OK message of step 820. The message is sent from other UE 810 across IPv4-compatible IMS core network 804, and thus requires interworking from IPv4 to IPv6 to reach the IPv6 destination address of UE 802. The interworking takes place at the P-CSCF 806.

Step 824 represents various transactions which take place to initiate the VoIP call and which use SDP and RTP. These transactions also require interworking, which in this figure take place at P-CSCF 806. Step 826 shows an SIP BYE message, indicating that other UE 810 has hung up the phone. This message requires interworking to reach UE 802, and is interworked at P-CSCF 806. Step 828 shows an SIP 200 OK message in response to the BYE message, acknowledging the hangup at UE 802. This message also requires interworking from IPv6 to IPv4. It is of course possible for UE 802 to hang up the phone first, which would cause the initial BYE message to be sent from UE 802 to other UE 810 using interworking, and would also cause the OK message to be sent from other UE 810 to UE 802.

Figure 9:
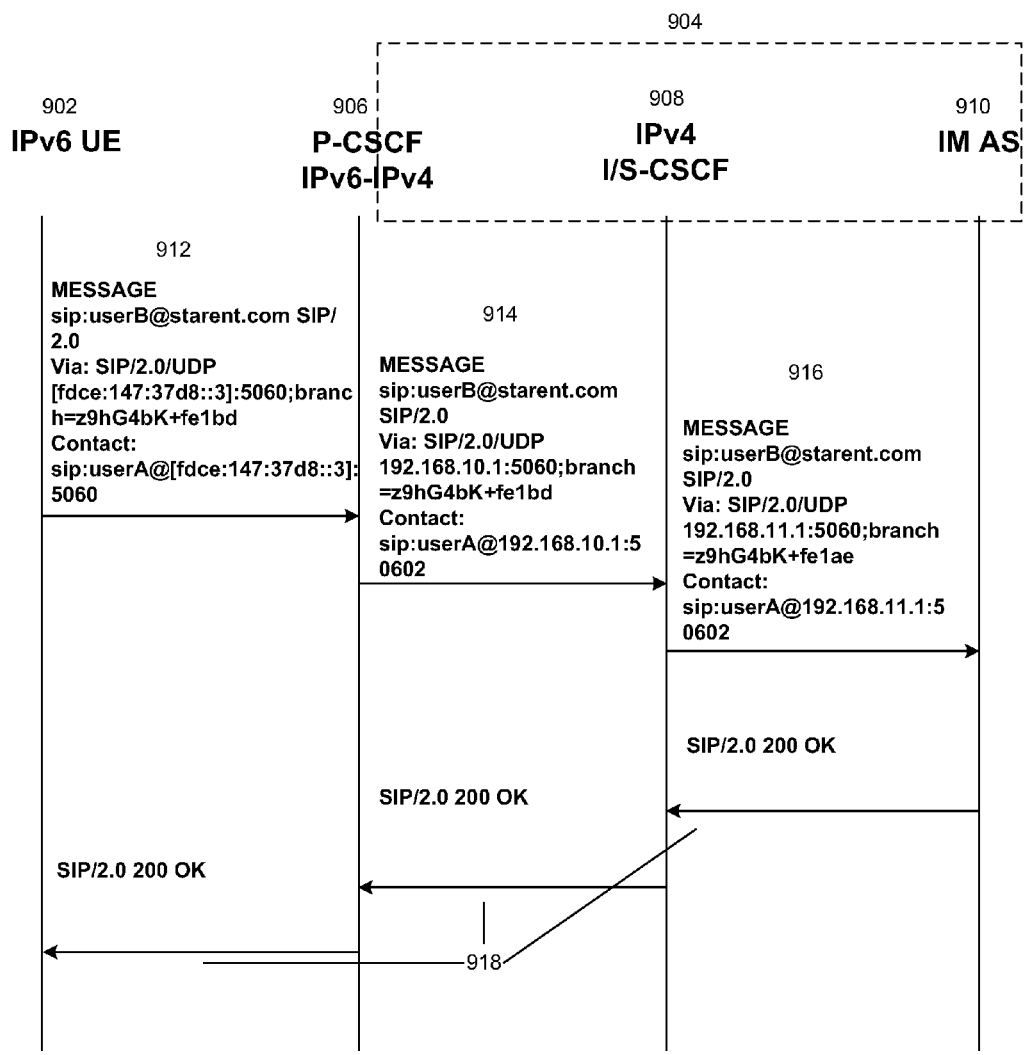
FIG. 9 is a signaling diagram of instant messaging for an IPv6 UE from an IPv4 IMS core network, in accordance with certain embodiments.

FIG. 9 is a call flow diagram for SIP instant messaging from an IPv6-capable UE 902 over an IPv4-capable IMS core network to an instant messaging application server (IM AS) 910 in accordance with certain embodiments. This is handled in a way similar to the handling of other SIP services such as the VoIP call flow described in FIG. 7 and the associated description. SIP instant messaging may be handled using the session initiation protocol for instant messaging and presence leveraging extensions (SIMPLE). IPv6-compatible UE 902 has previously associated with P-CSCF 906, and P-CSCF 906 has set the v4v6_interworking flag in a data structure stored at the P-CSCF. In step 912, UE 902 sends an SIP MESSAGE message, containing a destination URI, "userB@starent.com," a SIP Via: header with an IPv6 address, and a SIP Contact: header with an IPv6 address. In step 914, the message is received by access service V6-SVC (not shown) at P-CSCF 906, which forwards the message to access service V4-SVC (not shown) at P-CSCF 906. V4-SVC interworks the SIP message by replacing the original Via: header with its own address, and the IPv6 address in the Contact: header with a new IPv4 address allocated from a pool. In step 916, P-CSCF then forwards the message to I/S-CSCF 908 over IPv4, which rewrites the SIP Via: header and forwards the packets to IM AS 910. In step 918, IM AS 910 responds to the instant message with a SIP 200 OK message, which passes from IM AS 910 to I/S-CSCF 908 to P-CSCF 906 and then to UE 902. The 200 OK message may or may not require interworking at the P-CSCF 906.

Figure 10:
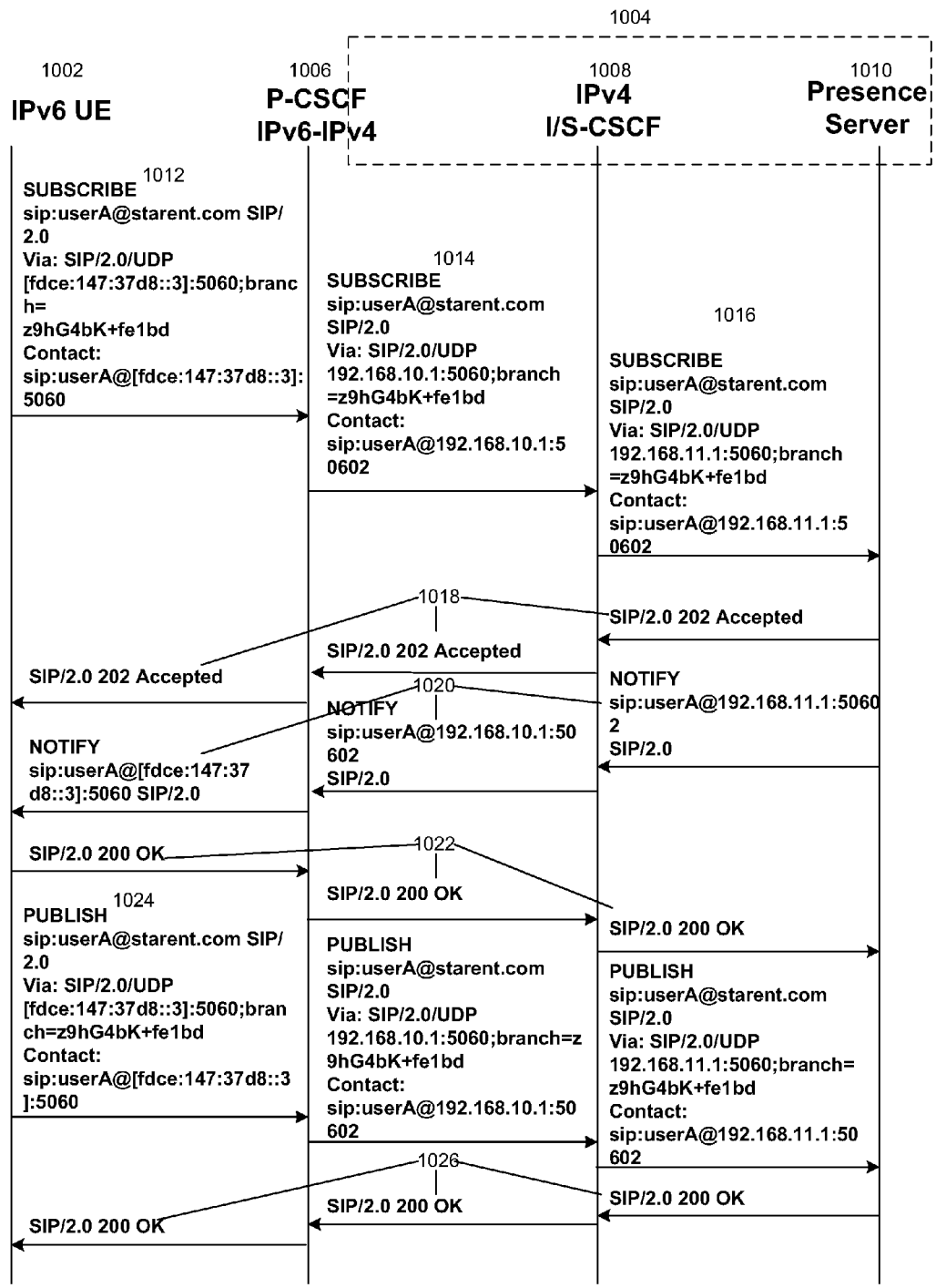
FIG. 10 is a signaling diagram of subscription by an IPv6 UE with an IPv4 IMS core network, in accordance with certain embodiments.

FIG. 10 is a call flow diagram for SIP presence, specific event notification and event state publication in accordance with certain embodiments. SIP presence is a mechanism enabled by the SIP messages PUBLISH, SUBSCRIBE and NOTIFY that enables user agents to publish user presence information to a presence server and subscribe to updates for presence information. This is analogous to being logged on to an instant messaging server, observing status messages of other buddies on a buddy list, and receiving instant messages. In FIG. 10, an IPv6 UE is connected via an IPv4 IMS core network 1004 to a presence server 1010 that provides these services. The connection is made through a dual-stack P-CSCF 1006 and an IPv4 I/S-CSCF 1008. UE 1002 has previously associated with IMS core network 1004, so that the v4v6_interworking flag has already been set as described above.

UE 1002 initiates the connection to the presence server by sending SIP SUBSCRIBE message 1012 to P-CSCF 1006. SUBSCRIBE message 1012 includes IPv6 addresses in at least the Contact: and Via: header fields. P-CSCF 1006 interworks the message by allocating an IPv4 address from a pool or by using a previously-allocated IPv4 address mapped to the IPv6 address of UE 1002. Interworked message 1014 is then forwarded to IPv4 I/S-CSCF 1008, where it is updated with the address of I/S-CSCF 1008. Updated message 1016 is then forwarded to its destination, presence server 1010, possibly via other network nodes, where the presence server registers the IPv4 address of UE 1012 as a subscriber for the desired URI. Step 1018 shows a 202 Accepted response from the presence server 1010 being forwarded back through the IPv4 core network 1004 and IPv4 I/S-CSCF 1008 to dual-stack P-CSCF 1006, which then may interwork the message before forwarding the message over IPv6 to UE 1002. Step 1020 occurs when a NOTIFY message from presence server 1010, indicating that a change has been published to the URI that UE 1002 has subscribed to. The NOTIFY message is sent back through the IPv4 core network 1004 as described above, interworked by P-CSCF 1006, and transmitted over IPv6 to UE 1002. Similarly, step 1022 shows a 200 OK response from UE 1002 being interworked from IPv6 to IPv4 at P-CSCF 1006 and forwarded to presence server 1010 over IPv4.

Step 1024 shows a SIP PUBLISH message, which is used by UE 1002 to update information on presence server 1010 that other UEs may subscribe to, being sent by UE 1002 to presence server 1010. In this instance, message 1024 contains IPv6 addresses that are interworked by P-CSCF 1006 according to the above procedure, and then forwarded using IPv4 to presence server 1010. Presence server 1010 may subsequently send out NOTIFY messages indicating that data has changed on the server. Other UEs that are subscribed to UE 1002 thus need only connect to presence server 1010, which may be done solely over the IPv4 IMS core network 1004 or may be done using IPv6 and an interworked connection as well. Step 1026 shows the presence server 1010 responding to the PUBLISH message by UE 1002. The 200 OK response is interworked at P-CSCF 1006 before being forwarded to UE 1002.

IPv4-IPv6 interworking at the P-CSCF may incorporate other features in certain embodiments. RTP control protocol (RTCP) packets are typically used in conjunction with RTP sessions. Some embodiments may generate RTCP packets periodically at the P-CSCF and transmit them to both the UE and the IMS core network. In doing so, RTCP packets for an IPv6-compatible UE may be sent over IPv6, and RTCP packets for an IPv4-compatible UE may be sent out over IPv4. Checkpointing may be incorporated into flows or software modules managing packet streams or sessions for both IPv4 and IPv6, such that appropriate parameters are checkpointed and stored for the flows to be reinstalled upon recovery. The Boolean flag indicating the need for v4/v6 interworking may be checkpointed and recovered as part of the checkpointing of subscriber calling data.

The ability of a dual-stack device such as a dual-stack P-CSCF to maintain transport control protocol (TCP) connections is not adversely affected because TCP connections are maintained separately on a per-service basis. Services not upgraded to interwork across different IP versions or to understand IPv6 will continue to operate normally without conflict on the same server with other services that have been upgraded. Similarly, universal datagram protocol (UDP) fragmentation and reassembly may be permitted for both IPv4 and IPv6. As well, P-CSCF external interfaces like Rx, Rf and DNS are supported on both IPv4 and IPv6. As these servers are configured statically in P-CSCF, either IPv4 or IPv6 can be used depending on the IP address type supported by peer servers.

A new command-line interface (CLI) and accompanying configuration files and data structures may be added for configuration of the V4/v6 interworking feature. Configuration may be done using syntax and access controls similar to that for existing CLIs. Configuration may be extended for access services such as V4-SVC and V6-SVC as well as for the core service. An example configuration is as follows:

Privilege: Administrator, config-administrator
    Mode: config-cscf-service
    access-service name <svc_name>
    Privilege: Administrator, config-administrator
    Mode: config-cscf-service
    core-service name <svc_name>

As it may be useful to collect statistics on service availability, all statistics and bulk statistics that are collected on a typical IPv4-compatible P-CSCF may also be collected for a dual-stack device such as a P-CSCF capable of interworking. A command-line interface (CLI) may also be used to display these statistics, with particular syntax or flags used to indicate whether IPv4 or IPv6 statistics are desired. IMS statistics may also be recorded, such as packet traffic on the Gm interface between the UE and the P-CSCF and packet traffic on the Mw interface between and among P-CSCF, I-CSCF, and S-CSCF. The IP address in this CLI may be given as :: (unspecified IPv6 address) to indicate Gm interface. The statistics manager may automatically collect relevant statistics from each device. An example is below:

show cscf sip statistics name <svc_name> interface ip address::
    show cscf sip statistics name <svc_name> interface ip address <ipv4_address>
    show cscf sip statistics name <svc_name> interface domain name <domain_name>

Call Flows at S-CSCF

It is preferable to perform v4/v6 interworking at the S-CSCF instead of at the P-CSCF, thereby enabling communication with other IMS network nodes regardless of IP version. P-CSCF/I-CSCF will likely support the same IP version as the S-CSCF, but an interworking S-CSCF would permit interworking towards application servers and peer servers such as media gateway controller functions (MGCFs), or toward S-CSCFs in other domains.

Similar to the implementation of v4/v6 interworking on a P-CSCF, an interworking S-CSCF is a dual-stack device supporting IPv4 and IPv6 and may act in B2BUA mode as an SIP proxy. An interworking S-CSCF may identify the need for interworking on receiving a new request. If a translation lookup is done on a destination user, and the retrieved address is not local, a route request may be initiated. If the resulting next-hop server supports a different IP version from the incoming request, v4/v6 interworking may be done. If route lookup yields a domain name, a DNS query may be done to resolve the name to an IP address. This IP address may be for a different IP version from the incoming request, in which case interworking may be done. IP address allocation from pools used for modifying SDP headers and packets may be done during the route request itself Peer server addresses with different IP versions returned by LIR/LIA and ENUM lookups may also trigger v4/v6 interworking at the S-CSCF. When a previous peer server cannot be reached and S-CSCF attempts to connect to a different peer server using a hunting method or another method, S-CSCF may invoke v4/v6 interworking for peer servers as necessitated by the IP versions of incoming requests, the S-CSCF, or the network.

On determining if v4/v6 interworking is required for a particular request, the request is forwarded through a peer S-CSCF access service running the same IP version as that of the next-hop server. As a B2BUA, the egress S-CSCF service may receive SIP requests, perform interworking by replacing all IP addresses in the outgoing request with the appropriate version for the next-hop server, and then may subsequently send the outgoing request acting as a client. SDP packets in each direction may also be interworked with IP addresses from pools configured under corresponding S-CSCFs for handling media. During interworking, a pair of custom SIP Record-Route headers is added, with the top Record-Route header containing an identifier for the outbound call leg and the bottom Record-Route header containing an identifier for the inbound call leg. A X-ST-CID custom parameter is used to tag or identify these Record-Route headers.

Figure 11:
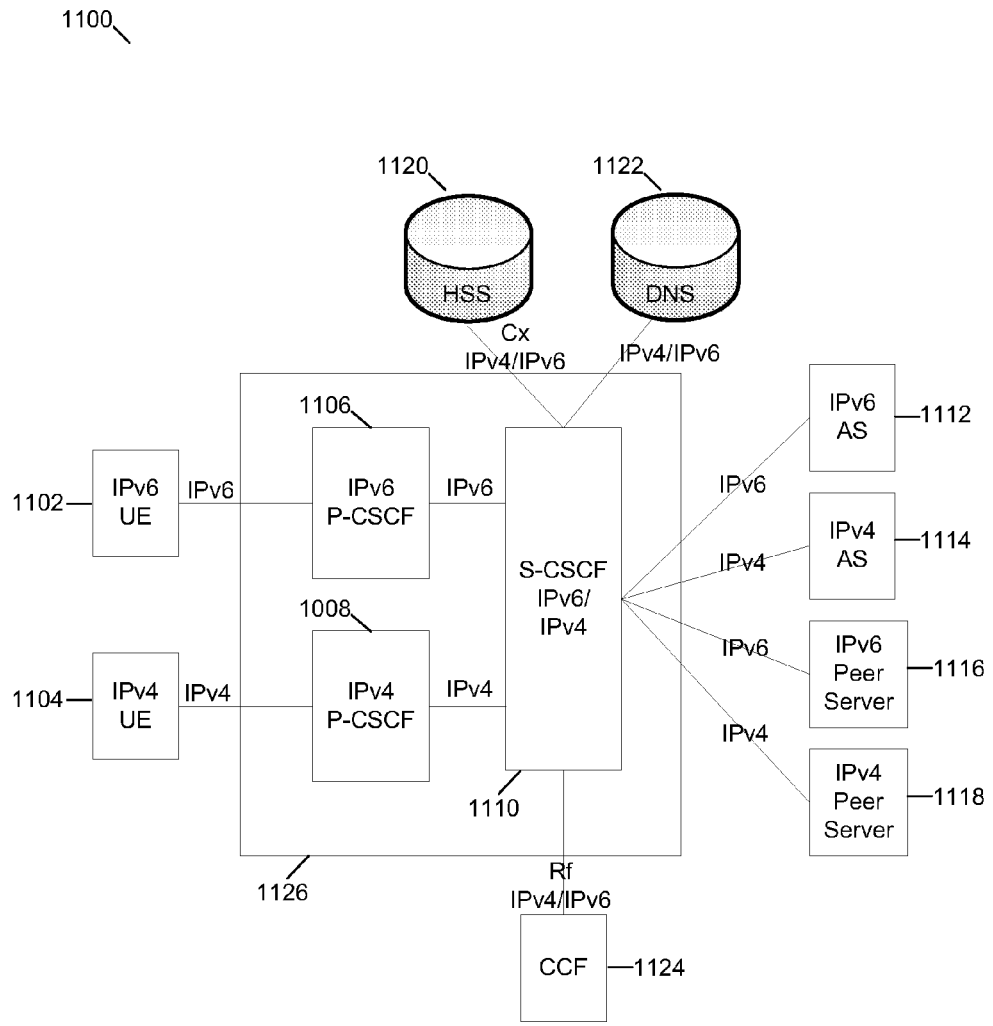
FIG. 11 is a schematic representation of a wireless data network with IPv4 and IPv6 UEs, a mixed-protocol core network and a dual-stack S-CSCF providing interworking, in accordance with certain embodiments.

FIG. 11 illustrates a representative embodiment of an IMS network in which the S-CSCF is responsible for interworking. Wireless network 1100 contains UE 1102 which supports IPv6 and UE 1104 which supports IPv4. IPv6 UE 1102 is connected to IPv6-compatible P-CSCF over IPv6, which is connected to dual-stack S-CSCF 1110 over IPv6. IPv4 UE 1104 is connected to IPv4-compatible P-CSCF over IPv4, which is connected to dual-stack S-CSCF 1110 over IPv4. Dual-stack S-CSCF is connected over either IPv4 or IPv6 to IPv6 application server 1112, IPv4 application server 1114, IPv6 peer server 1116 and IPv4 peer server 1118. Peer servers 1116 and 1118 may also be IMS S-CSCFs or another type of CSCF. Dual-stack S-CSCF is also connected over both IPv4 and IPv6 to HSS server 1120, DNS server 1122, and charging control function (CCF) server 1124. The network nodes inside box 1126 are collectively known as a CSCF, and may be implemented as software and/or hardware modules on one or more hardware devices. Unlike in the figures presented above, P-CSCFs 1106, 1108 are single-stack devices supporting either IPv4 or IPv6, and S-CSCF 1110 is a dual-stack device supporting both IPv4 and IPv6.

Figure 12:
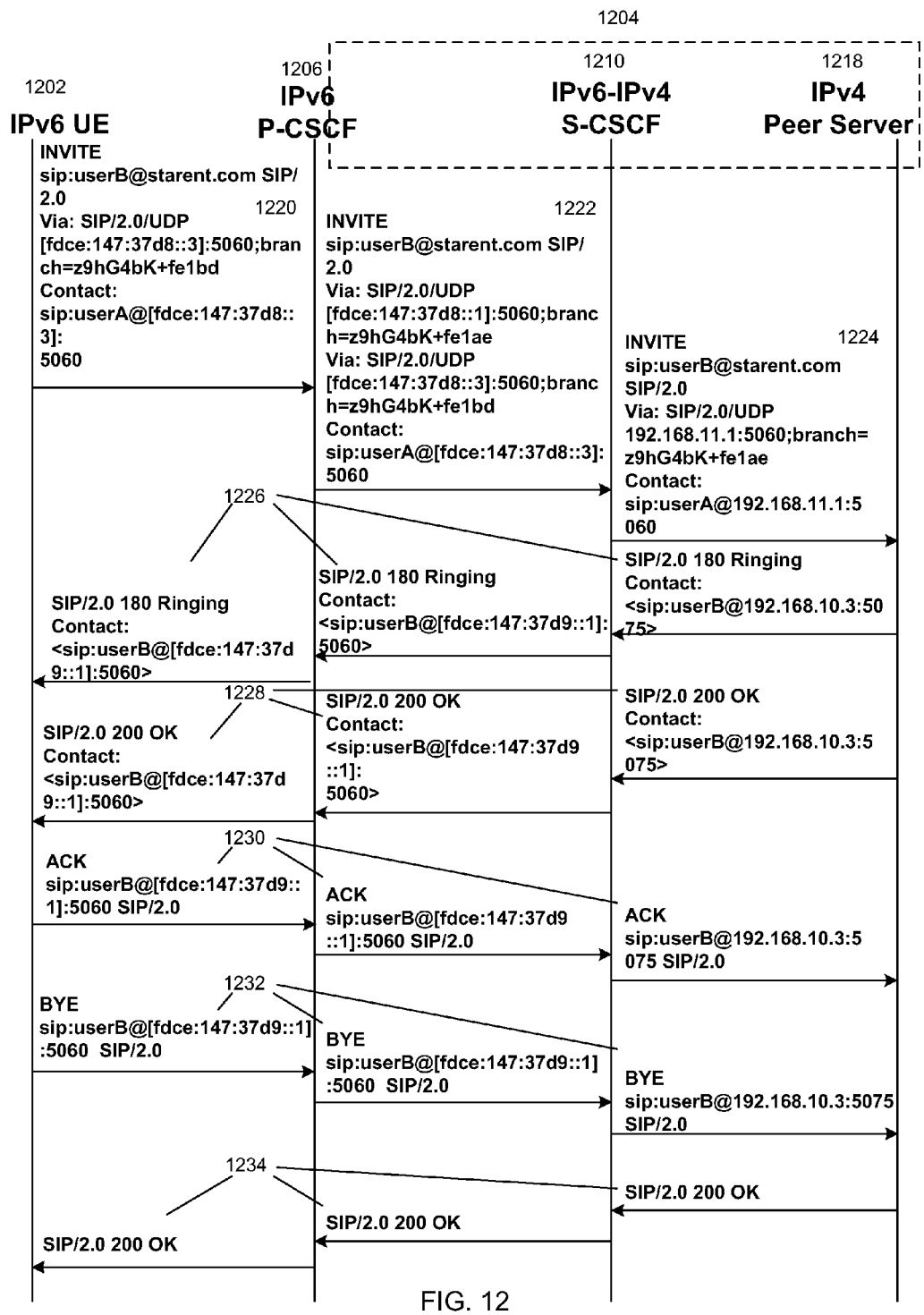
FIG. 12 is a signaling diagram of call signaling for an IPv6 UE originating a call towards an IPv4 peer server via a dual stack S-CSCF, in accordance with certain embodiments.

FIG. 12 is a representative call flow diagram of an IPv6 UE connecting to an IPv4 peer server via an interworking S-CSCF, according to certain embodiments. IPv6 UE 1202 is connected to IPv6 P-CSCF 1206, which is connected to dual-stack S-CSCF 1210 over IPv6. S-CSCF 1210 is connected to IPv4 peer server 1218 over IPv4. When multiple S-CSCFs exist on the same local network, a UE may be registered with any S-CSCF on the local network and may still be considered a local user, such as with UEs 1202 and 1218. In step 1220, UE 1202 sends an INVITE message to P-CSCF 1206, with the SIP URI "userB@starent.com" as its destination. The message contains plaintext SIP headers that include the IPv6 address of the UE, such as in the Via: and Contact: headers. In step 1222, P-CSCF 1206 receives the message and appends its own IPv6 address in the Via: header before passing it on to S-CSCF 1210. In step 1224, dual-stack S-CSCF 1210 interworks the message before sending it out to IPv4 peer server 1218.

Interworking takes place in a similar way as the method described above for dual-stack interworking P-CSCFs. S-CSCF 1210 first receives the message from P-CSCF 1206 at access service V6-SVC (not shown). V6-SVC checks whether a v4v6_interworking flag has been set on the session, and if it has not been set, checks whether the next hop destination on the way to the final destination is an IPv4 or IPv6 address. In this case the flag has not been set, and both the next hop and final destinations are the same, IPv4 peer server 1218. Since IPv4 peer server 1218 does not support IPv6, a DNS query for peer server 1218 returns an A record and no AAAA record. This causes V6-SVC to set the v4v6_interworking flag and forward the message to V4-SVC (not shown) on S-CSCF 1210. V4-SVC interworks the message headers by allocating a new IPv4 address and port from a pool of addresses for UE 1202 and replacing the IPv6 addresses with the new IPv4 address. Since it is not necessary, no IPv4 address for P-CSCF 1206 is generated, although one may be generated in some embodiments. The mapping is stored at the S-CSCF, possibly in a session data structure. V4-SVC then forwards the interworked message in step 1224, and it is received by peer server 1218.

Step 1226 shows a SIP 180 RINGING message being sent from the IPv4 peer server 1218 using IPv4, interworked at the S-CSCF 1210 to IPv6, and received at the UE 1202. Step 1228 shows a SIP 200 OK message similarly sent from peer server 1218, interworked at the S-CSCF 1210 to IPv6, and received at UE 1202. Step 1230 shows a SIP ACK message being sent from UE 1202 in IPv6, interworked at S-CSCF 1210 into IPv4, and received at peer server 1218. Step 1232 similarly shows a SIP BYE message being sent from UE 1202 in IPv6, interworked at S-CSCF 1210 into IPv4, and received at peer server 1218. Peer server 1218 responds with a SIP 200 OK message, which may be sent to UE 1202 without interworking in some embodiments, or with working as required.

S-CSCF 1210 may also perform v4/v6 interworking for calls between users registered in different S-CSCFs with different IP versions. During route request/lookup, if S-CSCF 1210 sees the translation as local but the terminating user is found to be registered in peer S-CSCF which runs on a different IP version, then v4/v6 interworking will be performed by S-CSCF 1210. The allocation of IP addresses from pools for modifying SIP, SDP or RTP headers is done during route request itself.

If the translation is local and the terminating user is not found in a local cache of the current S-CSCF or any peer S-CSCF, then the request may be forwarded to a software module managing CSCF functions, which may be called CSCFMGR in some embodiments. CSCFMGR then may forward the request to a session manager or other hardware and/or software module that is aware of where the user is registered. If the session manager finds the terminating user to be registered with a peer S-CSCF that uses a different IP version, v4/v6 interworking may be invoked. As well, some embodiments may employ a centralized or distributed database to determine which S-CSCF a given user is registered to.

If the terminating user has multiple Contact: addresses registered and the S-CSCF is forking, then v4/v6 interworking will be performed for those Contacts whose IP version is different from the current S-CSCF's IP version. The same pool IP addresses and port may be used in SDP modification for all the Contacts involving v4/v6 interworking because eventually the session will be established with only one Contact: address.

Figure 13:
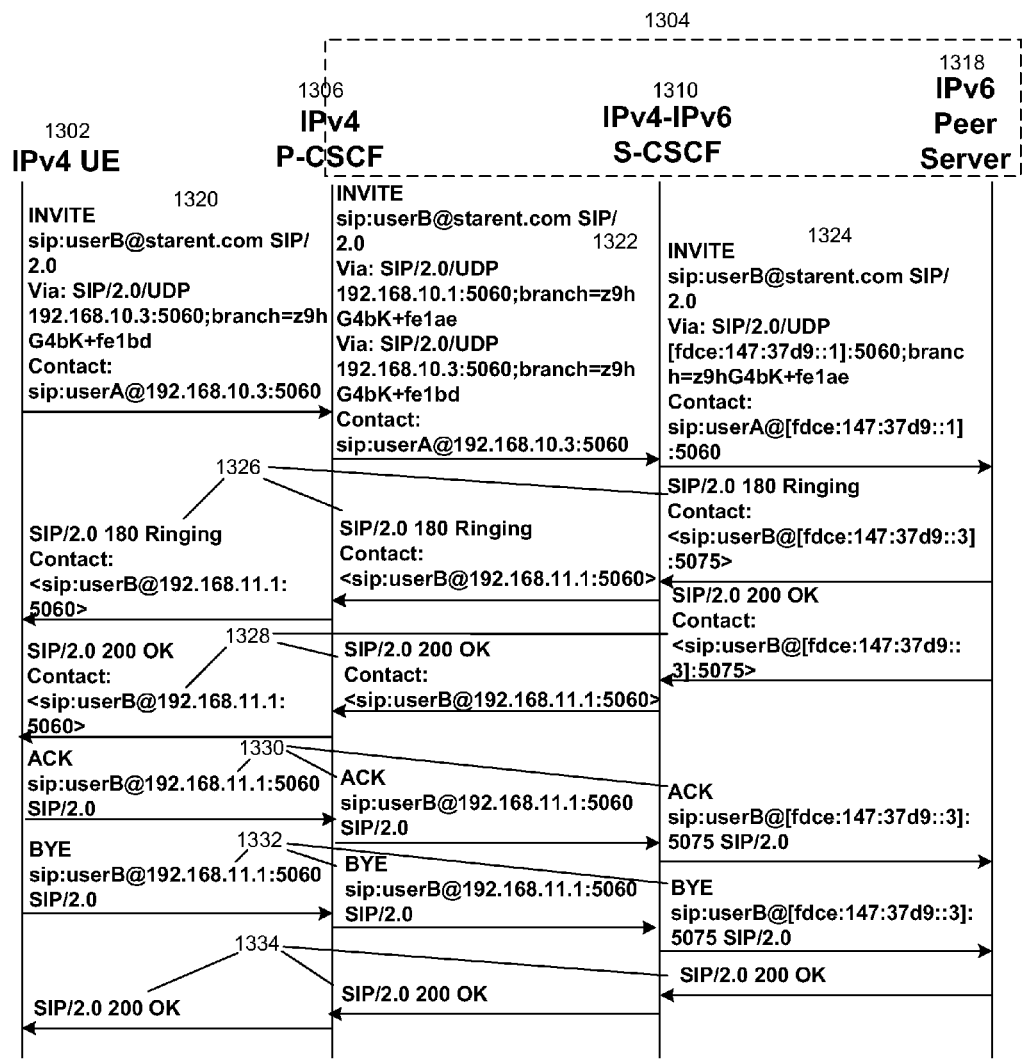
FIG. 13 is a signaling diagram of call signaling for an IPv4 UE originating a call towards an IPv6 peer server via a dual stack S-CSCF, in accordance with certain embodiments.

FIG. 13 is a representative call flow diagram similar to FIG. 12 with an IPv4 UE connecting to an IPv6 peer server via an interworking S-CSCF, according to certain embodiments. IPv4 UE 1302 is connected to IPv4 P-CSCF 1106, which is connected to dual-stack S-CSCF 1310 over IPv4. S-CSCF 1310 is connected to IPv6 peer server 1318 over IPv6. In step 1320, UE 1302 sends an INVITE message to P-CSCF 1306, with the SIP URI "userB@starent.com" as its destination. The message contains plaintext SIP headers that include the IPv4 address of the UE, such as in the Via: and Contact: headers. In step 1322, P-CSCF 1306 receives the message and appends its own IPv4 address in the Via: header before passing it on to S-CSCF 1310. In step 1324, dual-stack S-CSCF 1310 interworks the message before sending it out to IPv6 peer server 1318. Interworking takes place in a similar way as the method described above for FIG. 12, with the protocol versions being switched. Similarly, SIP RINGING message 1226, SIP 200 OK message 1328, SIP ACK message 1330, SIP BYE message 1332, and SIP 200 OK message 1334 are all interworked at dual-stack S-CSCF 1310 in a manner similar to that described above for FIG. 12, with the protocol versions being switched. Interworking in the reverse direction poses no special problems; in fact, a v4/v6 interworking S-CSCF or P-CSCF typically should be able to interwork from v4 to v6 and vice versa, as messages must go back and forth in both directions.

Figure 14:
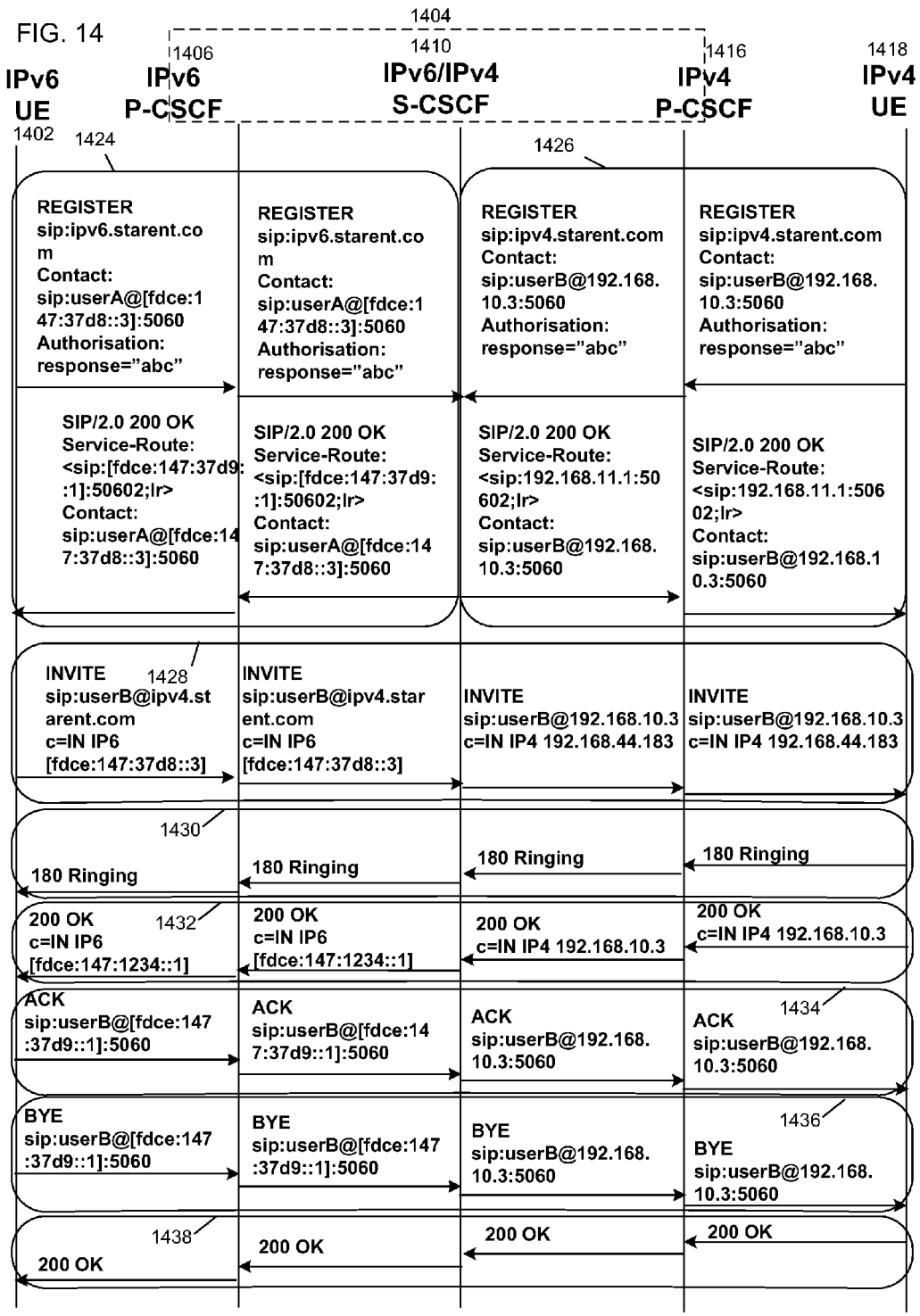
FIG. 14 is a signaling diagram of call signaling between an IPv4 UE and an IPv6 UE via a dual stack S-CSCF, in accordance with certain embodiments.

FIG. 14 is a representative call flow diagram for two UEs registered to the same dual-stack interworking S-CSCF calling each other over different IP protocol versions, according to certain embodiments. IPv6 UE 1402 is connected via IPv6 P-CSCF to dual-stack S-CSCF 1410; IPv4 UE 1418 is connected via IPv4 P-CSCF 1416 to dual-stack S-CSCF 1410. This corresponds to the depicted network diagram and reference numbers 1102-1110 in FIG. 11. In box 1424, UE 1402 sends a REGISTER message via P-CSCF 1406 to S-CSCF 1410 using IPv6, registering the URI "sip:ipv6.starent.com" with the S-CSCF according to the SIP protocol, and S-CSCF 1410 acknowledges the registration. UE 1402 is now able to receive calls. In box 1426, UE 1418 also registers the URI "sip:ipv4.starent.com" over IPv4 with S-CSCF 1410. Both UEs are now registered with S-CSCF 1410.

In SIP, a S-CSCF performs registration by maintaining a list of registered request-URIs. The URIs may be any valid URI and need not be either IPv4 or IPv6; in FIG. 14, both UE 1402 and UE 1418 have used domain names and not IP addresses to perform registration. These registrations may be commingled in a single list, so that S-CSCF 1410 need not maintain separate lists for IPv4 registrations and IPv6 registrations. When a SIP query for a particular URI is received at S-CSCF 1418, it may pass the SIP query from the access service that receives it to a core CSCF module (not shown), which consults the list of all registrations and returns the relevant information. In this way, CSCF and S-CSCF functions may be implemented in an IP protocol version-neutral fashion. Interworking may thus be limited to the replacing of addresses at the access service before a message is sent out.

Steps 1428-1438 show a SIP INVITE request 1428, a SIP 180 RINGING response 1430, a SIP 200 OK response 1432, a SIP ACK response 1434, a SIP BYE response 1436, and a SIP 200 OK response 1438 in the call flow order that would occur during a telephone call from IPv6 UE 1402 to IPv4 UE 1418. The messages are interworked at dual-stack S-CSCF 1410 from IPv6 to IPv4 and vice versa according to the method disclosed above.

Figure 15:
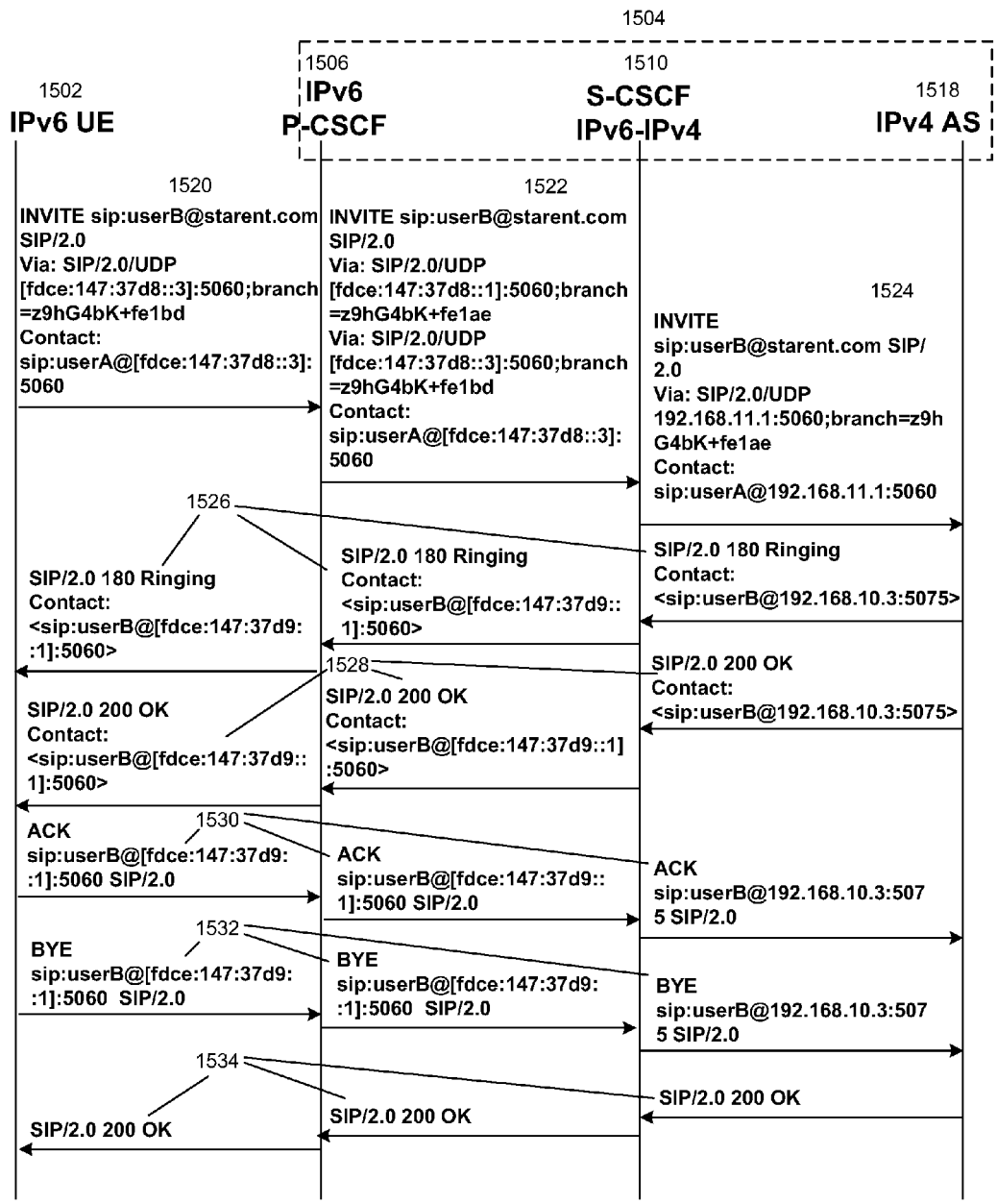
FIG. 15 is a signaling diagram of call signaling between an IPv6 UE and an IPv4 IMS application server via a dual stack S-CSCF, in accordance with certain embodiments.

FIG. 15 is a representative call flow diagram of an IPv6 UE connecting to an IPv4 application server (AS) 1518 via an IPv6 P-CSCF 1506 and a dual-stack S-CSCF 1510, according to some embodiments. Interworking occurs at the dual-stack S-CSCF 1510. An application server may provide various different services using SIP and other protocols; however, the interworking is in most cases completely transparent to the AS. For requests going to application servers, the need for v4/v6 interworking may be identified after initial filter criteria (IFCs) are executed. This may be done by finding the application server's IP address and then comparing its version with the IP address version of the request as received at the S-CSCF. In this case, IP address allocation from pools used for modifying service description protocol (SDP) headers is done after the need for v4/v6 interworking is identified.

In step 1520, UE 1502 sends an INVITE message to P-CSCF 1506, with the SIP URI "userB@starent.com" as its destination. The message contains plaintext SIP headers that include the IPv6 address of the UE, such as in the Via: and Contact: headers. In step 1522, P-CSCF 1506 receives the message and appends its own IPv6 address in the Via: header before passing it on to S-CSCF 1510. In step 1524, dual-stack S-CSCF 1510 interworks the message before sending it out to IPv4 application server 1518.

Step 1526 shows a SIP 180 RINGING message being sent from the IPv4 application server 1518 using IPv4, interworked at the S-CSCF 1510 to IPv6, and received at the UE 1502. Step 1528 shows a SIP 200 OK message similarly sent from application server 1518, interworked at the S-CSCF 1510 to IPv6, and received at UE 1502. Step 1530 shows a SIP ACK message being sent from UE 1502 in IPv6, interworked at S-CSCF 1510 into IPv4, and received at application server 1518. Step 1532 similarly shows a SIP BYE message being sent from UE 1502 in IPv6, interworked at S-CSCF 1510 into IPv4, and received at application server 1518. Application server 1518 responds with a SIP 200 OK message, which may be sent to UE 1502 without interworking in some embodiments, or with interworking as required.

Figure 16:
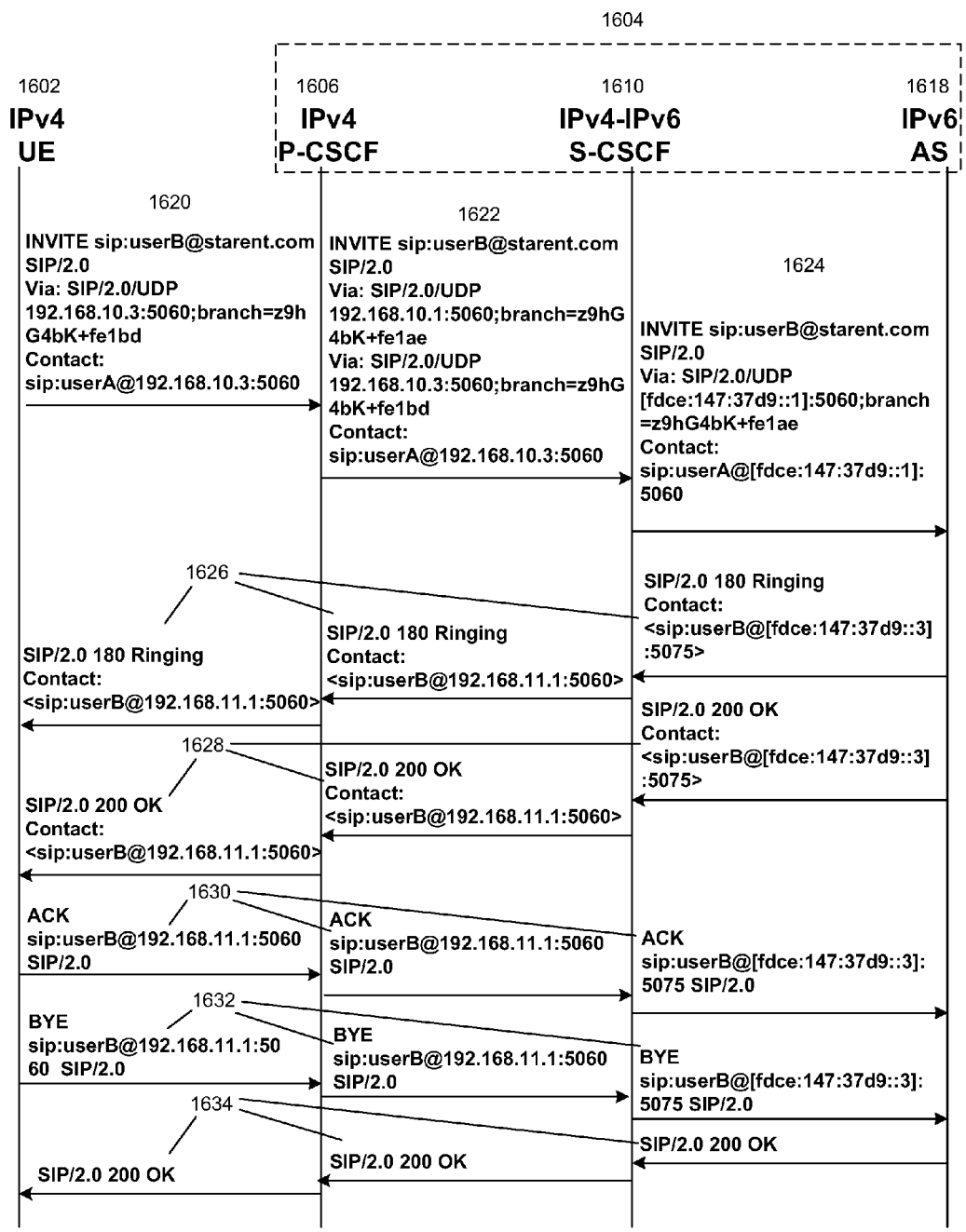
FIG. 16 is a signaling diagram of call signaling between an IPv4 UE and an IPv6 IMS application server via a dual stack S-CSCF, in accordance with certain embodiments.

FIG. 16 is a representative call flow diagram of an IPv4 UE connecting to an IPv6 application server 1618 via an IPv4 P-CSCF 1606 and a dual-stack S-CSCF 1610, according to some embodiments. Interworking occurs at the dual-stack S-CSCF 1610. This is the reverse of the case depicted in FIG. 15, which involves an IPv6 UE and an IPv4 application server. In step 1620, UE 1602 sends an INVITE message to P-CSCF 1606, with the SIP URI "userB@starent.com" as its destination. The message contains plaintext SIP headers that include the IPv4 address of the UE, such as in the Via: and Contact: headers. In step 1622, P-CSCF 1606 receives the message and appends its own IPv4 address in the Via: header before passing it on to S-CSCF 1610. In step 1624, dual-stack S-CSCF 1610 interworks the message before sending it out to IPv6 application server 1618.

Step 1626 shows a SIP 180 RINGING message being sent from the IPv6 application server 1618 using IPv6, interworked at the S-CSCF 1610 to IPv4, and received at the UE 1602. Step 1628 shows a SIP 200 OK message similarly sent from application server 1618, interworked at the S-CSCF 1610 to IPv4, and received at UE 1602. Step 1630 shows a SIP ACK message being sent from UE 1602 in IPv4, interworked at S-CSCF 1610 into IPv6, and received at application server 1618. Step 1632 similarly shows a SIP BYE message being sent from UE 1602 in IPv4, interworked at S-CSCF 1610 into IPv6, and received at application server 1618. Application server 1618 responds with a SIP 200 OK message, which may be sent to UE 1602 without interworking in some embodiments, or with working as required.

Figure 17:
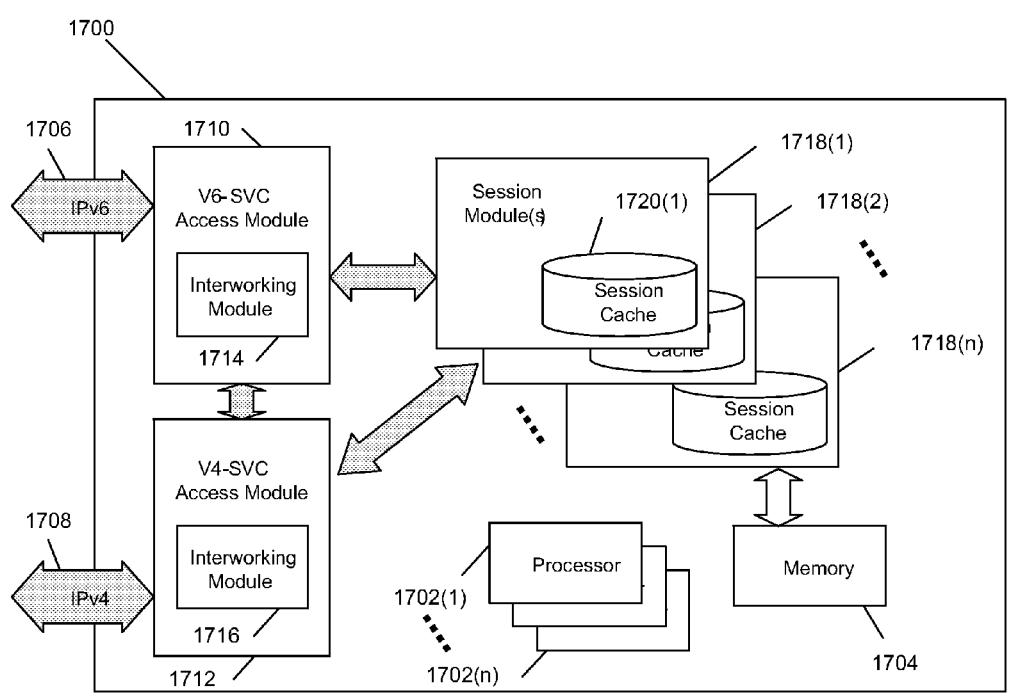
FIG. 17 is a functional block diagram of a network device in accordance with certain embodiments.

FIG. 17 is a functional block diagram of a CSCF implementing IPv4-IPv6 interworking according to some embodiments. CSCF 1700 contains all the other elements of the figure, and may be a S-CSCF, a P-CSCF or another type of CSCF. CSCF 1700 contains processor(s) 1702(1)-($n$) and memory 1704. CSCF 1700 also contains two network interfaces, IPv6 interface 1706 and IPv4 interface 1708. Either interface may be coupled to a mobile device via a radio access network, or an IMS core network, or other network nodes, according to the particular embodiment. IPv4 interface 1708 is capable of supporting IP packets and packet flows using the IPv4 protocol, and IPv6 interface 1706 is capable of supporting IP packets and packet flows using the IPv6 protocol. In some embodiments, V6-SVC access module 1710 implements an access service for IPv6 protocol packets, and V4-SVC access module 1712 implements an access service for IPv4 protocol packets. Both access modules 1710, 1712 contain interworking modules 1714, 1716, which provide interworking functions as described in this specification. When packets are received at one access module that require interworking, the packets may be forwarded to the other access module for interworking and processing. Processing occurs in conjunction with session modules 1718(1)-($n$), which store identifiers for call legs, as well as other data, in session caches 1720(1)-($n$) or memory 1704, according to the specific embodiment.

Various other features may be enabled via S-CSCF interworking, such as call forwarding. A S-CSCF may change the target of a request based on certain call forwarding features enabled for the user. In this case, if the IP version of the new target is different from the source IP address version, then v4/v6 interworking may be performed. Another example is the follow-me feature. When the follow-me feature is enabled for a subscriber, then v4/v6 interworking is performed while forwarding to the follow-me users with a different IP version. Another example is the command-line interface (CLI) used by the P-CSCF implementation to enable v4/v6 interworking. Interworking may also be permitted for S-CSCFs configured under the same VPN context. It is also possible to use v4/v6 interworking with any and all packet types and flows that have not heretofore been mentioned. All existing S-CSCF statistics and bulk statistics will be supported when v4/v6 interworking is enabled. If a flag is used, the flag indicating v4/v6 interworking may be stored in the CSCF session and may be checkpointed and recovered on task failures, along with any NPU flow parameters.

Further embodiments of the invention may incorporate support for lawful intercept, support for having both IPv4 and IPv6 P-CSCFs in the same VPN context, and other features, wherein each service is enabled to identify the appropriate IP version for each network node, and to effectively interwork messages if necessary.

User Equipment and Gateway

The user equipment described above can communicate with a plurality of radio access networks using a plurality of access technologies and with wired communication networks. The user equipment can be a smartphone offering advanced capabilities such as word processing, web browsing, gaming, e-book capabilities, an operating system, and a full keyboard. The user equipment may run an operating system such as Symbian OS, iPhone OS, RIM's Blackberry, Windows Mobile, Linux, Palm WebOS, and Android. The screen may be a touch screen that can be used to input data to the mobile device and the screen can be used instead of the full keyboard. The user equipment may have the capability to run applications or communicate with applications that are provided by servers in the communication network. The user equipment can receive updates and other information from these applications on the network.

The user equipment also encompasses many other devices such as televisions (TVs), video projectors, set-top boxes or set-top units, digital video recorders (DVR), computers, netbooks, laptops, and any other audio/visual equipment that can communicate with a network. The user equipment can also keep global positioning coordinates, profile information, or other location information in its stack or memory. The user equipment can have a memory such as a computer readable medium, flash memory, a magnetic disk drive, an optical drive, a programmable read-only memory (PROM), and/or a read-only memory (ROM). The user equipment can be configured with one or more processors that process instructions and run software that may be stored in memory. The processor can also communicate with the memory and interfaces to communicate with other devices. The processor can be any applicable processor such as a system-on-a-chip that combines a CPU, an application processor, and flash memory. The interfaces can be implemented in hardware or software. The interfaces can be used to receive both data and control information from the network as well as local sources, such as a remote control to a television. The user equipment can also provide a variety of user interfaces such as a keyboard, a touch screen, a trackball, a touch pad, and/or a mouse. The user equipment may also include speakers and a display device in some embodiments.

The gateway described above is implemented in a network device in some embodiments. This network device can implement multiple and different integrated functionalities. In some embodiments, one or more of the following functionalities can be implemented on the network device including a security gateway (SeGW), an access gateway, a Gateway General packet radio service Serving Node (GGSN), a serving GPRS support node (SGSN), a packet data inter-working function (PDIF), an access service network gateway (AS-NGW), a User Plane Entity (UPE), an IP Gateway, a session initiation protocol (SIP) server, a proxy-call session control function (P-CSCF), and an interrogating-call session control function (I-CSCF), a serving gateway (SGW), and a packet data network gateway (PDN GW), a mobility management entity (MME), a mobility access gateway (MAG), an HRPD serving gateway (HSGW), a local mobility anchor (LMA), a packet data serving node (PDSN), a foreign agent (FA), and/or home agent (HA). In certain embodiments, the functionalities are provided by a combination of hardware and software in the network device. General purpose hardware can be configured in the network device to provide one or more of these specialized functionalities.

Figure 18:
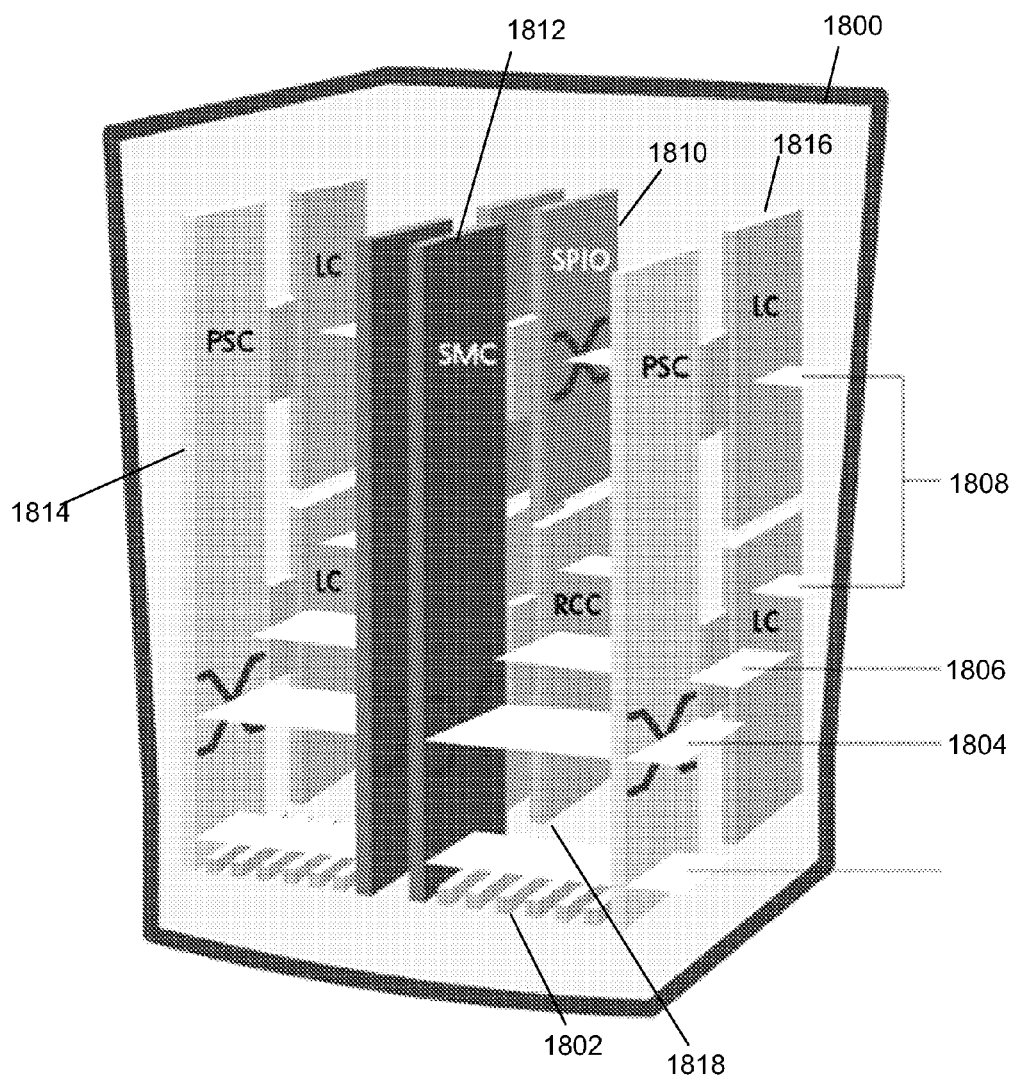
FIGS. 18-19 illustrate a network device in accordance with certain embodiments.

In some embodiments the network device is implemented using a collection of integrated circuit boards or cards. These cards include input/output interfaces for communication amongst each other, at least one processor for executing instructions and running modules that are stored in memory, and memory for storing data. The features of a network device that implements a gateway, in accordance with some embodiments, are further described below. FIG. 18 illustrates the implementation of a network device in accordance with some embodiments. The network device 1800 includes slots 1802 for loading application cards and line cards. A midplane can be used in the network device to provide intra-network device communications, power connections, and transport paths between the various installed cards. The midplane can include buses such as a switch fabric 1804, a control bus 1806, a system management bus, a redundancy bus 1808, and a time division multiplex (TDM) bus. The switch fabric 1804 is an IP-based transport path for user data throughout the network device implemented by establishing inter-card communications between application cards and line cards. The control bus 1806 interconnects the control and management processors within the network device. The network device management bus provides management of system functions such as supplying power, monitoring temperatures, board status, data path errors, card resets, and other failover features. The redundancy bus 1808 provides transportation of user data and redundancy links in the event of hardware failures. The TDM bus provides support for voice services on the system.

The network device supports at least four types of application cards: a switch processor I/O card (SPIO) 1810, a system management card (SMC) 1812, a packet service card (PSC) 1814, and a packet accelerator card (not shown). Other cards used in the network device include line cards 466 and redundant crossbar cards (RCC) 1818. The line cards 1816, when loaded in the network device, provide input/output connectivity to the network and other devices, as well as redundancy connections. The line cards 1816 include interfaces to the network through Ethernet, Fiber Optic, and the other communication mediums. The redundant crossbar card (RCC) 1818 includes a non-blocking crossbar and connections to each of the cards in the network device. This allows a redundant connection to be made through the redundant crossbar card 1818 from any one card to any other card in the network device. The SPIO card 1810 serves as a controller of the network device and is responsible for such things as initializing the network device and loading software configurations onto other cards in the network device.

The system management card (SMC) 1812 and switch processor card (not shown) are system control and management cards for managing and controlling other cards in the network device. The packet accelerator card (PAC) and packet service card (PSC) 1814 provide packet processing, context processing capabilities, and forwarding capabilities among other things. The PAC and PSC 1814 perform packet-processing operations through the use of control processors and a network processing unit. The network processing unit determines packet processing requirements; receives and transmits user data frames to/from various physical interfaces; makes IP forwarding decisions; implements packet filtering, flow insertion, deletion, and modification; performs traffic management and traffic engineering; modifies/adds/strips packet headers; and manages line card ports and internal packet transportation. The control processors, also located on the packet accelerator card, provide packet-based user service processing.

The operating system software can be based on a Linux software kernel and run specific applications in the network device such as monitoring tasks and providing protocol stacks. The software allows network device resources to be allocated separately for control and data paths. For example, certain packet accelerator cards and packet services cards can be dedicated to performing routing or security control functions, while other packet accelerator cards/packet services cards are dedicated to processing user session traffic. As network requirements change, hardware resources can be dynamically deployed to meet the requirements in some embodiments. The system can be virtualized to support multiple logical instances of services, such as technology functions (e.g., a SeGW PGW, SGW, MME, HSGW, PDSN, ASNGW, PDIF, HA, or GGSN).

The network device's software can be divided into a series of tasks that perform specific functions. These tasks communicate with each other as needed to share control and data information throughout the network device. A task is a software process that performs a specific function related to system control or session processing. Three types of tasks operate within the network device in some embodiments: critical tasks, controller tasks, and manager tasks. The critical tasks control functions that relate to the network device's ability to process calls such as network device initialization, error detection, and recovery tasks. The controller tasks mask the distributed nature of the software from the user and perform tasks such as monitor the state of subordinate manager(s), provide for intra-manager communication within the same subsystem, and enable inter-subsystem communication by communicating with controller(s) belonging to other subsystems. The manager tasks can control system resources and maintain logical mappings between system resources.

Individual tasks that run on processors in the application cards can be divided into subsystems. A subsystem is a software element that either performs a specific task or is a culmination of multiple other tasks. A single subsystem can include critical tasks, controller tasks, and manager tasks. Some of the subsystems that can run on a network device include a system initiation task subsystem, a high availability task subsystem, a recovery control task subsystem, a shared configuration task subsystem, a resource management subsystem, a virtual private network subsystem, a network processing unit subsystem, a card/slot/port subsystem, and a session subsystem.

The system initiation task subsystem is responsible for starting a set of initial tasks at system startup and providing individual tasks as needed. The high availability task subsystem works in conjunction with the recovery control task subsystem to maintain the operational state of the network device by monitoring the various software and hardware components of the network device. Recovery control task subsystem is responsible for executing a recovery action for failures that occur in the network device and receives recovery actions from the high availability task subsystem. Processing tasks are distributed into multiple instances running in parallel so if an unrecoverable software fault occurs, the entire processing capabilities for that task are not lost. User session processes can be sub-grouped into collections of sessions so that if a problem is encountered in one sub-group users in another sub-group will not be affected by that problem.

The architecture also allows check-pointing of processes, which is a mechanism to protect the system against any critical software processes that may fail. The self-healing attributes of the software architecture protects the system by anticipating failures and instantly spawning mirror processes locally or across card boundaries to continue the operation with little or no disruption of service. This unique architecture allows the system to perform at the highest level of resiliency and protects the user's data sessions while ensuring complete accounting data integrity.

Shared configuration task subsystem provides the network device with an ability to set, retrieve, and receive notification of network device configuration parameter changes and is responsible for storing configuration data for the applications running within the network device. A resource management subsystem is responsible for assigning resources (e.g., processor and memory capabilities) to tasks and for monitoring the task's use of the resources.

Virtual private network (VPN) subsystem manages the administrative and operational aspects of VPN-related entities in the network device, which include creating separate VPN contexts, starting IP services within a VPN context, managing IP pools and subscriber IP addresses, and distributing the IP flow information within a VPN context. In some embodiments, within the network device, IP operations are done within specific VPN contexts. The network processing unit subsystem is responsible for many of the functions listed above for the network processing unit. The card/slot/port subsystem is responsible for coordinating the events that occur relating to card activity such as discovery and configuration of ports on newly inserted cards and determining how line cards map to application cards.

The session subsystem is responsible for processing and monitoring a mobile subscriber's data flows in some embodiments. Session processing tasks for mobile data communications include: S1/S5/S8 interface termination for LTE networks, A10/A11 interface termination for CDMA networks, GSM tunneling protocol (GTP) termination for GPRS and/or UMTS networks, asynchronous PPP processing, IPsec, packet filtering, packet scheduling, Diffsery codepoint marking, statistics gathering, IP forwarding, and AAA services, for example. Responsibility for each of these items can be distributed across subordinate tasks (called managers) to provide for more efficient processing and greater redundancy. A separate session controller task serves as an integrated control node to regulate and monitor the managers and to communicate with the other active subsystem. The session subsystem also manages specialized user data processing such as payload transformation, filtering, statistics collection, policing, and scheduling.

In providing emulation, as MIPv4 is received from a mobile node, the session subsystem can setup a MIPv4 termination and setup a PMIPv6 session towards the core network. A session manager can track the mapping of the sessions and processing to provide the emulation and interworking between the networks. A database can also be used to map information between the sessions, and store, for example, NAI, HoA, AE information in some embodiments.

Figure 19:
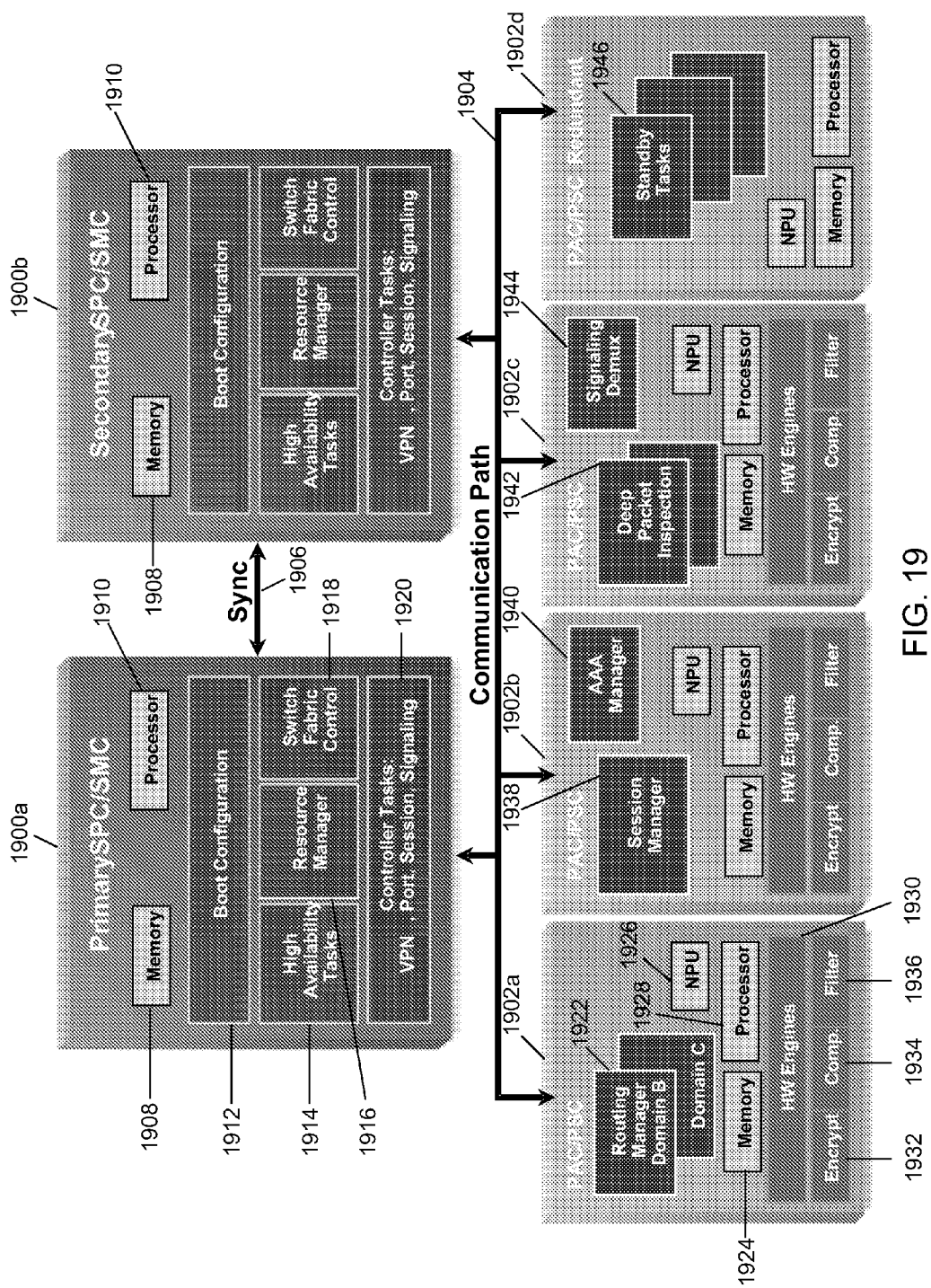

The network device allows system resources to be allocated separately for control and data paths. For example, certain PACs/PSCs could be dedicated to performing routing or security control functions while other PACs/PSCs are dedicated to processing user session traffic. As network requirements grow and call models change, hardware resources can be added to accommodate processes, such as encryption, packet filtering, etc., that require more processing power. FIG. 19 illustrates a logical view of the software architecture of a network device in accordance with certain embodiments. As shown, the software and hardware can be distributed within the network device and across different circuit boards, processors, and memory. FIG. 19 includes a primary switch processor card (SPC)/system management card (SMC) 1900a, a secondary SPC/SMC 1900b, PAC/PSC 1902a-1902d, a communication path 1904, and a synchronization path 1906. The SPC/SMC 1900 include a memory 1908, a processor 1910, a boot configuration 1912, high availability tasks 1914, resource manager 1916, switch fabric control 1919, and controller tasks 1920.

The SPC/SMC 1900 manage and control the network device including the other cards in the network device. The SPC/SMC 1900 can be configured in a primary and secondary arrangement that provides redundancy and failsafe protection. The modules or tasks running on the SPC/SMC 1900 are related to network device wide control and management. The boot configuration task 1912 includes information for starting up and testing the network device. The network device can also be configured to startup in different configurations and providing different implementations. These can include which functionalities and services are capable of running on the SPC/SMC 1900. The high availability task 1914 maintains the operational state of the network device by monitoring the device and managing recovery efforts to avoid disruption of service. The resource manager tracks and assigns the available resources for sessions and demands on the network device. This can include load balancing among different processors and tasks running on the network device. Processes can be distributed across the system to fit the needs of the network model and specific process requirements. For example, most tasks can be configured to execute on SPC/SMC 1900 or a PAC/PSC 1902, while some processor intensive tasks can also be performed across multiple PACs/PSCs to utilize multiple CPU resources. Distribution of these tasks is invisible to the user. The switch fabric control 1918 controls the communication paths in the network device. The controller tasks module 1920 can manage the tasks among the resources of the networks to provide, for example, VPN services, assign ports, and create, delete, and modify sessions for user equipment.

The PAC/PSC 1902 are high-speed processing cards that are designed for packet processing and the tasks involved with providing various network functionalities on the network device. The PAC/PSC 1902 include a memory 1924, a network processing unit (NPU) 1926, a processor 1928, a hardware engine 1930, an encryption component 1932, a compression component 1934, and a filter component 1936. Hardware engines 1930 can be deployed with the card to support parallel distributed processing for compression, classification traffic scheduling, forwarding, packet filtering, and statistics compilations. The components can provide specialize processing that can be done more efficiently than using a general processor in some embodiments.

Each PAC/PSC 1902 is capable of supporting multiple contexts. The PAC/PSC 1902 are also capable of running a variety of tasks or modules. PAC/PSC 1902*a* provides routing managers 1922 with each covering routing of a different domain. PAC/PSC 1902*b* provides a session manager 1938 and an AAA manager 1940. The session manager 1938 manages one or more sessions that correspond to one or more user equipment. A session allows a user equipment to communicate with the network for voice calls and data. The AAA manager 1940 manages accounting, authentication, and authorization with an AAA server in the network. PAC/PSC 1902 provides a deep packet inspection task 542 and a signaling demux 1944. The deep packet inspection task 1942 provides inspection of packet information beyond layer 4 for use and analysis by the network device. The signaling demux 1944 can provide scalability of services in combination with other modules. PAC/PSC 502*d* provides redundancy through standby tasks 1946. Standby tasks 1946 store state information and other task information so that the standby task can immediately replace an active task if a card fails or if there is a scheduled event to remove a card.

In some embodiments, the software needed for implementing a process or a database includes a high level procedural or an object-orientated language such as C, C++, C#, Java, or Perl. The software may also be implemented in assembly language if desired. Packet processing implemented in a network device can include any processing determined by the context. For example, packet processing may involve high-level data link control (HDLC) framing, header compression, and/or encryption. In certain embodiments, the software is stored on a storage medium or device such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow.

We claim:

1. An apparatus comprising:
   a processor;
   a memory coupled to the processor configured for storing state information relating to a session between a mobile node and a remote endpoint on an IP Multimedia Subsystem (IMS) network;
   a first network interface for communicating with the mobile node via a radio access network;
   a second network interface for communicating with the IMS network;
   a back-to-back user agent (B2BUA) module for providing session initiation protocol (SIP) services between the mobile node via the first network interface and the IMS network via the second network interface;
   a session module configured to receive packet data units (PDUs) from the first network interface and the second network interface and to use an inbound identifier and an outbound identifier with the session; and
   an interworking module coupled to the first network interface and the second network interface that is configured to interwork between SIP messages that use an IPv4 protocol and SIP messages that use an IPv6 protocol by replacing addresses compatible with the IPv4 protocol in a SIP protocol header with addresses compatible with the IPv6 protocol, and is configured to use at least one of the inbound identifier and the outbound identifier to match an incoming SIP message to the session, thereby enabling interworking between IPv4 and IPv6 SIP messages
   wherein the apparatus comprises a call session control function (CSCF); and
   wherein the interworking module is configured to determine whether to perform interworking based on control information stored at the apparatus.

2. The apparatus of claim 1, wherein the interworking module is operable to allocate IP addresses from a pool of IP addresses.

3. The apparatus of claim 2, wherein the apparatus is operable to perform network address translation (NAT) using the pool of IP addresses.

4. The apparatus of claim 1, wherein the apparatus is operable to use the inbound identifier and the outbound identifier to identify a process instance that is currently handling the session.

5. The apparatus of claim 1, wherein the inbound identifier and the outbound identifier are stored in an outgoing SIP message in a Record-Route header in conjunction with a custom parameter.

6. The apparatus of claim 1, wherein the state information is stored in a memory located at a process instance.

7. The apparatus of claim 1, wherein IPv4 packets are received at a first access service at the apparatus, IPv6 packets are received at a second access service at the apparatus, and the first access service forwards SIP messages to the second access service before interworking is performed.

8. The apparatus of claim 1, wherein the interworking module determines whether to perform interworking using the availability of a domain name system (DNS) AAAA record for a next-hop routing address.

9. The apparatus of claim 1, wherein the apparatus is a serving CSCF, the mobile node is a user equipment (UE), and the radio access network is an evolved universal terrestrial radio access network (EUTRAN).

10. A method comprising:
    receiving a mobility message at a call session control function (CSCF) from a mobile device for communication on an IP multimedia subsystem (IMS) network using a first IP protocol version;
    determining, at the CSCF, whether to perform interworking of the mobility message before forwarding the mobility message based on control information stored at the CSCF;
    if it is determined to perform interworking, interworking the mobility message at the CSCF from the first IP protocol version to a second IP protocol version by substituting, in a SIP protocol header in the mobility message, addresses compatible with the first IP protocol version with addresses compatible with the second IP protocol version;

populating a mapping table with an inbound call leg identifier and an outbound call leg identifier and session information;

storing the inbound call leg identifier and the outbound call leg identifier in the mobility message; and forwarding the mobility message from the CSCF to a destination using the second IP protocol version, thereby operating a back-to-back user agent (B2BUA) for the mobile device.

11. The method of claim 10, wherein the control information stored at the CSCF comprises a previously-set flag.

12. The method of claim 10, further comprising determining whether to perform interworking of the mobility message based on the inbound call leg identifier and the outbound call leg identifier previously stored in the mobility message at the CSCF.

13. The method of claim 10, wherein the CSCF uses the availability of a domain name system (DNS) AAAA record to determine whether to perform interworking of the mobility message.

14. The method of claim 10, wherein the mobility message is a SIP message and the CSCF is a serving-call session control function (S-CSCF).

15. A non-transitory computer readable medium storing computer program instructions, which when executed by a computer, are configured to cause the computer to:

receive a message associated with a session using a first IP protocol at a first access service at a call session control function (CSCF) connected to an IP multimedia subsystem (IMS) network and to a mobile device over a radio access network;

forward the message to a second access service at the CSCF;

set control information to indicate whether interworking is needed for the session;

if the control information indicates that interworking is needed, interwork a session protocol header in the message from the first IP protocol to a second IP protocol at the CSCF using state information relating to a session in a memory at the CSCF by substituting addresses compatible with the first IP protocol with addresses compatible with the second IP protocol;

send the message from the second access service using the second IP protocol;

and thereby operate a back-to-back user agent (B2BUA) for the mobile device.

16. The non-transitory computer readable medium of claim 15, the instructions being further configured to cause the computer to interwork the session protocol header in the message from the first protocol to the second protocol at the second access service.

17. The non-transitory computer readable medium of claim 15, the instructions being further configured to cause the computer to use the state information to identify pre-interworking IP addresses.

18. The non-transitory computer readable medium of claim 15, wherein the control information comprises a per-session flag.

19. The non-transitory computer readable medium of claim 15, the instructions being further configured to allocate an IP address from a predetermined pool of addresses.

20. The non-transitory computer readable medium of claim 15, wherein the first protocol is IPv4 and the second protocol is IPv6, and wherein the CSCF is a serving-call session control function (S-CSCF), and wherein the state information is a custom parameter in an SIP Record-Route header.

* * * * *